(12) United States Patent
Lee et al.

(10) Patent No.: US 8,648,802 B2
(45) Date of Patent: Feb. 11, 2014

(54) COLLAPSIBLE INPUT DEVICE

(71) Applicants: Jinha Lee, Cambridge, MA (US); Hiroshi Ishii, Cambridge, MA (US)

(72) Inventors: Jinha Lee, Cambridge, MA (US); Hiroshi Ishii, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/773,519

(22) Filed: Feb. 21, 2013

(65) Prior Publication Data

US 2013/0241831 A1   Sep. 19, 2013

Related U.S. Application Data

(63) Continuation of application No. 13/026,156, filed on Feb. 11, 2011, now abandoned.

(51) Int. Cl.
*G06F 3/033* (2013.01)
*G06F 5/00* (2006.01)
*G06T 15/00* (2011.01)

(52) U.S. Cl.
USPC ............ 345/158; 345/173; 345/179; 345/419

(58) Field of Classification Search
USPC ............. 345/156–183, 419; 178/18.01–19.05
See application file for complete search history.

(56) References Cited

U.S. PATENT DOCUMENTS

| | | | |
|---|---|---|---|
| 5,748,110 A | 5/1998 | Sekizawa et al. | |
| 2002/0075286 A1* | 6/2002 | Yonezawa et al. | 345/679 |
| 2004/0140965 A1* | 7/2004 | Wang et al. | 345/179 |
| 2006/0176277 A1 | 8/2006 | Daniel et al. | |
| 2007/0139398 A1* | 6/2007 | Holman et al. | 345/179 |
| 2008/0225007 A1* | 9/2008 | Nakadaira et al. | 345/173 |
| 2009/0213076 A1 | 8/2009 | Eichenberger et al. | |
| 2010/0001926 A1* | 1/2010 | Amirparviz et al. | 345/7 |
| 2011/0083106 A1* | 4/2011 | Hamagishi | 715/836 |
| 2011/0115751 A1* | 5/2011 | Wernersson | 345/179 |
| 2013/0021288 A1* | 1/2013 | Karkkainen et al. | 345/173 |

\* cited by examiner

*Primary Examiner* — Hong Zhou
(74) *Attorney, Agent, or Firm* — Stephen R. Otis

(57) ABSTRACT

In exemplary implementations of this invention, a handheld, collapsible input device (CID) may be employed by a user to input and manipulate 3D information. The CID telescopes in length. As a user presses the CID against a display screen, the physical length of the CID shortens, and the display screen displays a virtual end of the CID that appears to project through the screen into the virtual 3D space behind the screen. The total apparent length of the CID, comprised of a physical portion and a virtual portion, remains the same (after taking into account foreshortening). Thus, the user experience is that, as the user holds the physical CID and pushes it against the display screen, the end of the CID appears to be pushed through the display screen into the virtual 3D space beyond it. The CID housing may include a push button for user input.

20 Claims, 35 Drawing Sheets

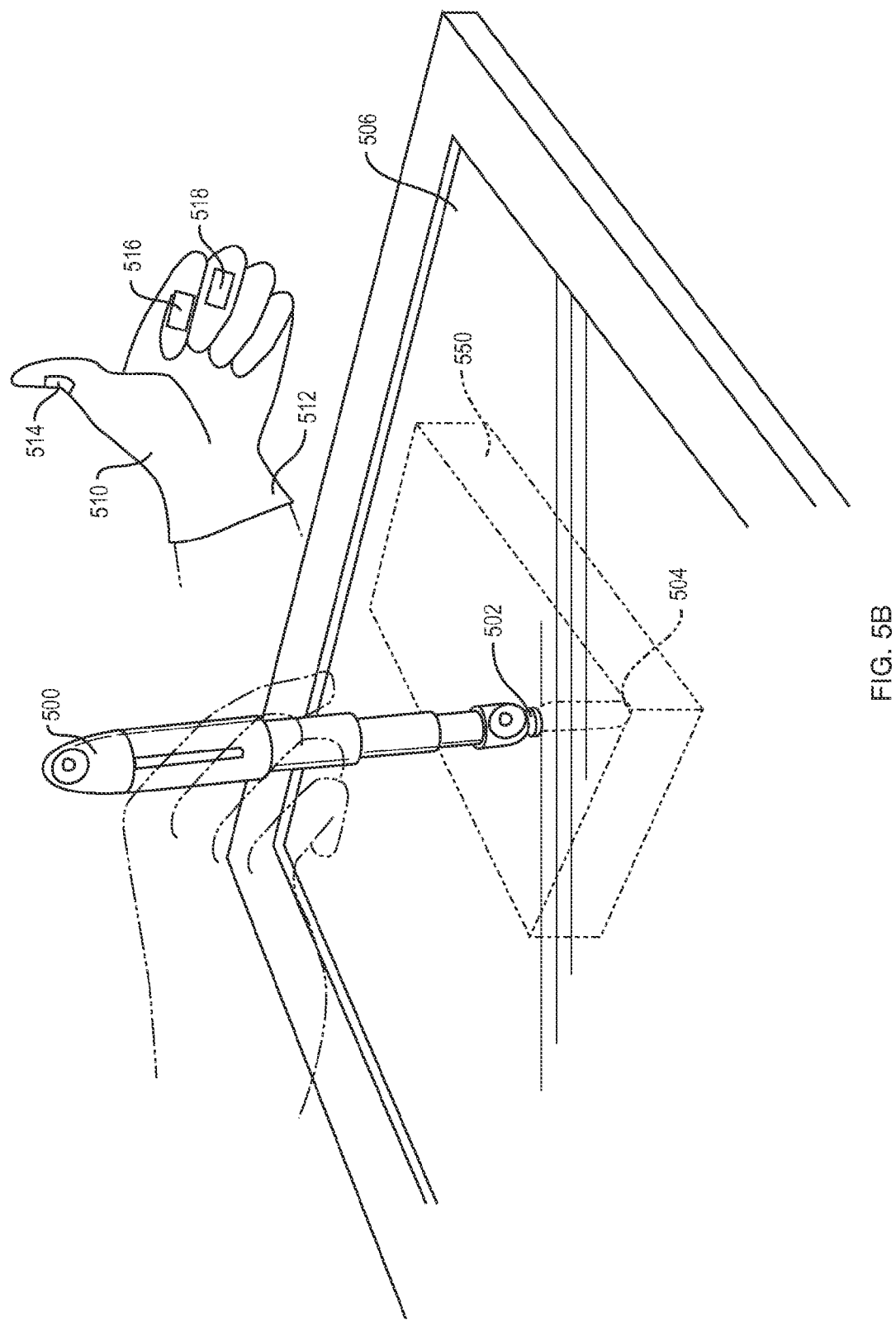

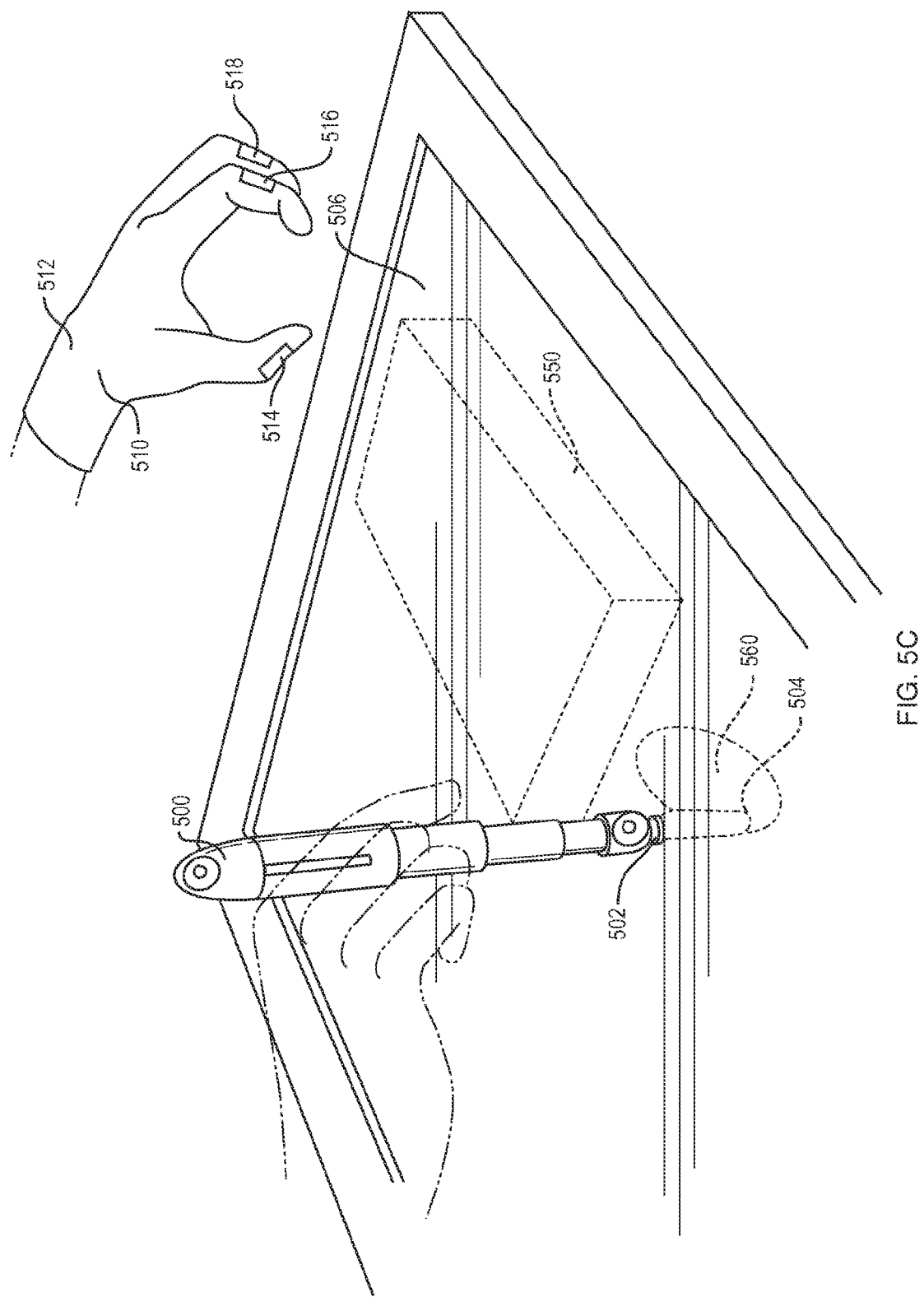

COLLAPSIBLE INPUT DEVICE

RELATED APPLICATION

This application is a continuation of, and claims the benefit of the filing date of, U.S. patent application Ser. No. 13/026,156, filed Feb. 11, 2011, the entire disclosure of which is herein incorporated by reference.

FIELD OF THE TECHNOLOGY

The present invention relates generally to input and interaction technologies.

SUMMARY

In exemplary implementations of this invention, a handheld, collapsible input device (CID) may be employed by a user to input and manipulate 3D information. The CID is long, like a pencil or pen. It telescopes in length. As a user presses the CID against a display screen, the physical length of the CID shortens: i.e., the CID physically collapses. As it does so, the display screen displays a virtual end of the CID that appears to project through the screen into the virtual 3D space behind the screen. The total apparent length of the CID, comprised of a physical portion and a virtual portion, remains the same (after taking into account foreshortening).

Based on the length, position, and orientation of the device, the part of the device that is physically collapsed is rendered on the screen such that the user perceives that the CID continues into the virtual world beyond the screen.

Thus, the user experience is that, as the user holds the physical CID and pushes it against a display screen, the end of the CID appears to be pushed through the display screen into the virtual 3D space beyond it.

In exemplary implementations, the CID may be used to manipulate 3D information in a variety of ways. For example, a user may draw virtual 3D objects, such as a chair, using the virtual tip of the CID. Or a user may cut a virtual slice out of a virtual apple, using a virtual end of a CID which is, for that purpose, shaped like a saw or serrated cutting edge. From the user's perspective, it appears that the CID is directly manipulating 3D information beyond the screen.

Also, a user may create virtual 3D objects by selecting from a menu of shapes. For example, a user may cause a virtual rectangle to be formed adjacent to the virtual tip of a CID, and then cause a virtual rectangular cuboid to be extruded from the rectangle. The shape may be selected from a menu by selecting an icon on a display screen. Or a user may select a shape from the menu by making a hand gesture with one hand, while holding the CID with the other hand.

In exemplary embodiments, a grid function may be employed. It allows the virtual tip of the CID to snap to a point on a virtual 3D grid, making it easier for the user to create 3D objects with precise dimensions. Furthermore, a user may use the virtual tip of the CID to select three points to define a plane in virtual 3D space, then move the 3D plane to the 2D display surface and draw on that plane, and then reinsert the plane (with the drawing on it), into the virtual 3D space.

In exemplary embodiments, haptic feedback is employed to heighten the illusion that the CID is directly interacting with virtual 3D objects in the virtual space beyond the display screen. This haptic feedback may vibratory. Alternately, a linear actuator in the CID may stop the physical CID from collapsing further, or even push the physical CID back into the user's hand, when the virtual end of the CID interacts with a virtual object.

A number of working prototypes of this invention have been built.

In two of these prototypes, reflective IR tags are used to determine the physical length of the CID as well as the 2D position and tilt angle of the CID relative to the display screen. In a third prototype, a linear potentiometer in the CID measures the physical length of the CID. In this third prototype, magnetic sensors in the display screen measure the 2D position and tilt angle of the CID relative to the display screen.

In some prototypes, a user's head position is tracked using stereo infrared cameras and an ear-mounted infrared LED. The user's head position is used to determine the user's line of gaze into the virtual space beyond the display screen. This allows virtual objects, such as the virtual tip of the CID, to be displayed from the correct angle from the user's perspective. In another prototype, a user's head position is determined by face recognition. Alternately, gaze tracking may be used to determine a user's line of sight.

The CID housing may include a push button for user input.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 5A to 5C show a user holding a CID in one hand, and making gestures with the other hand. The various gestures cause different 3D virtual shapes to be formed. The virtual end of the CID may used to position these 3D shapes.

FIG. 5A shows a virtual square being created in this way.

FIG. 5B shows a virtual rectangular cuboid being extruded in this way.

FIG. 5C shows a virtual ellipsoid being created in this way.

FIGS. 6A, 6B, 6C, 6D, 6E and 6F, respectively, show gestures that the system may recognize as instructions to form a straight line, form a square, form an ellipse, extrude from an existing shape, lock a surface, or move in a specified direction.

In FIG. 17A, the prototype is fully extended to maximum physical length.

In FIG. 20A, the CID is extended to full physical length. In FIG. 20B, the CID is collapsed to a shorter length.

FIG. 25A shows lenticular lenslets for 3D display.

FIG. 25B shows a parallax barrier for 3D display.

FIGS. 25C and 25D show integral imaging.

In FIG. 27A, an overhead projector is used. In FIG. 27B, the projection is from below. In FIG. 27C, a pico-projector is mounted on a CID.

The above Figures illustrate some illustrative implementations of this invention, or provide information that relates to those implementations. However, this invention may be implemented in many other ways. The above Figures do not show all of the details of this invention.

DETAILED DESCRIPTION

In exemplary implementations of this invention, a handheld, collapsible input device (CID) may be employed by a user to input and manipulate 3D information.

Figure 1:
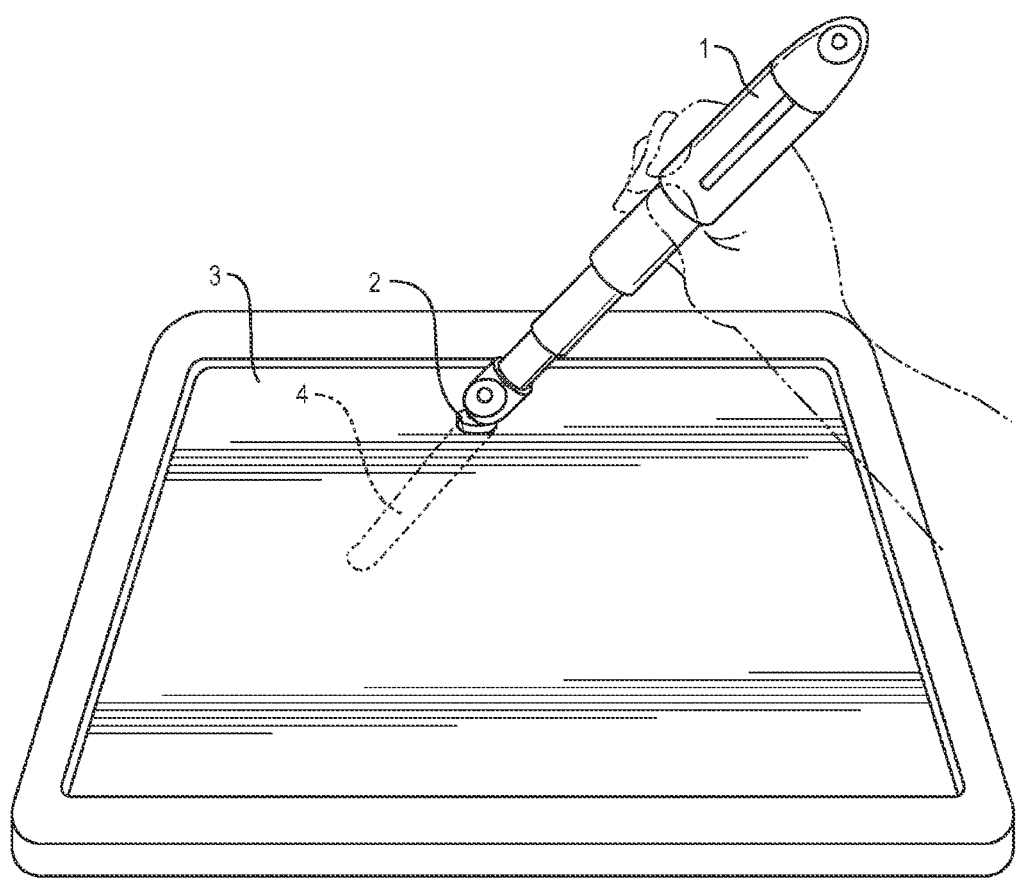
FIG. 1 shows a collapsible input device (CID) being held by a user, with the virtual end of the CID projecting beyond the display screen into the virtual 3D space behind the screen.

FIG. 1 shows a user holding a CID 1 and pressing the tip 2 of the CID 1 against a display screen 3. The display screen 3 displays a virtual end 4 of the CID. From the user's perspective, it appears that the CID is being pushed through the display screen 3 into a virtual 3D space beyond the screen.

Figure 2A:
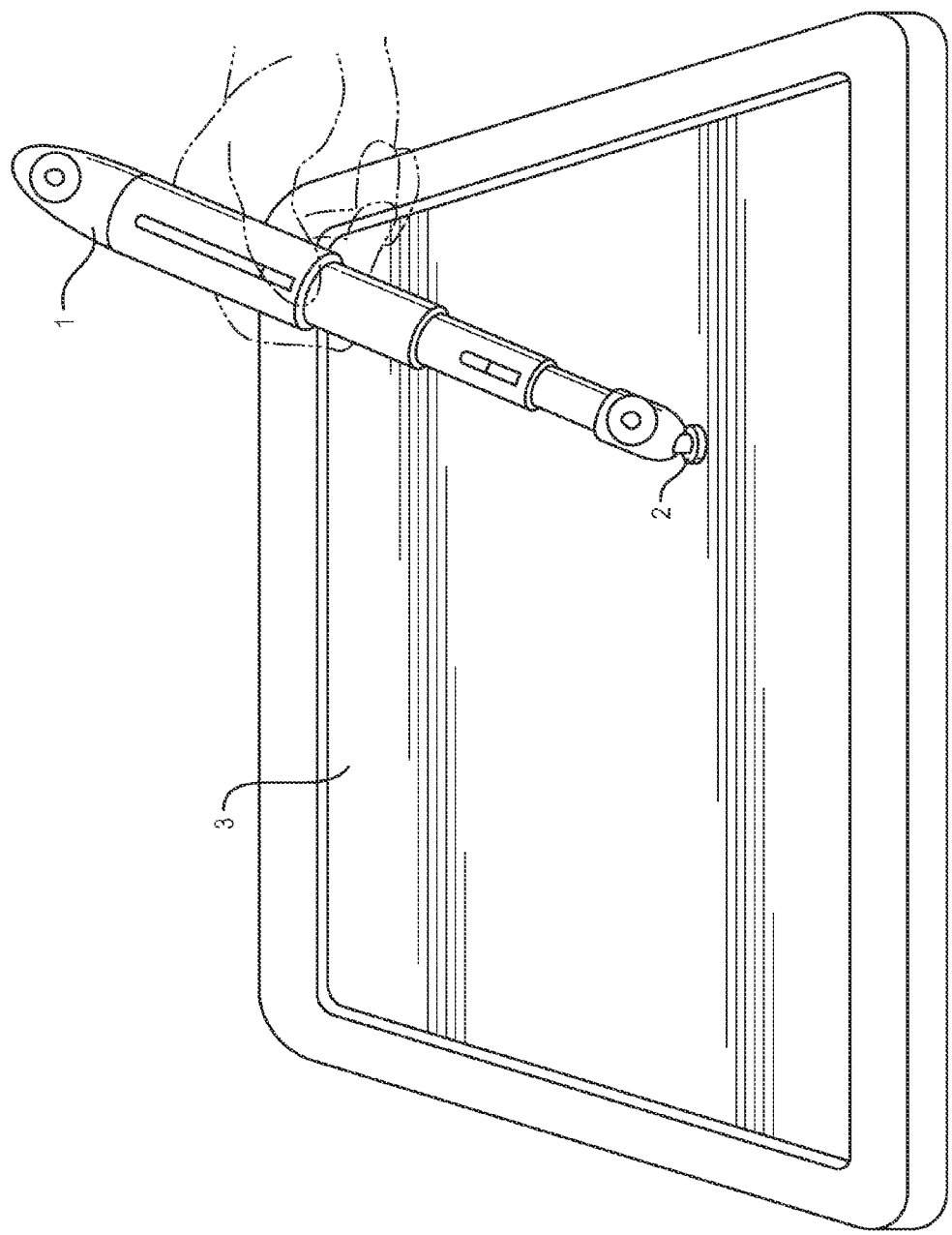
FIG. 2A shows a CID, with full physical extension and no virtual end.

FIG. 2A also shows a user holding a CID 1 and touching its tip 2 to the display screen 3. However, in FIG. 2A, the physical CID 1 is telescoped to its full length, and the display screen 3 does not display a virtual end of the CID. From a user's perspective, it appears that the CID 1 is resting on the surface of the display screen 3 and is not pushed through the display screen 3 into the virtual 3D space beyond the screen.

Figure 2B:
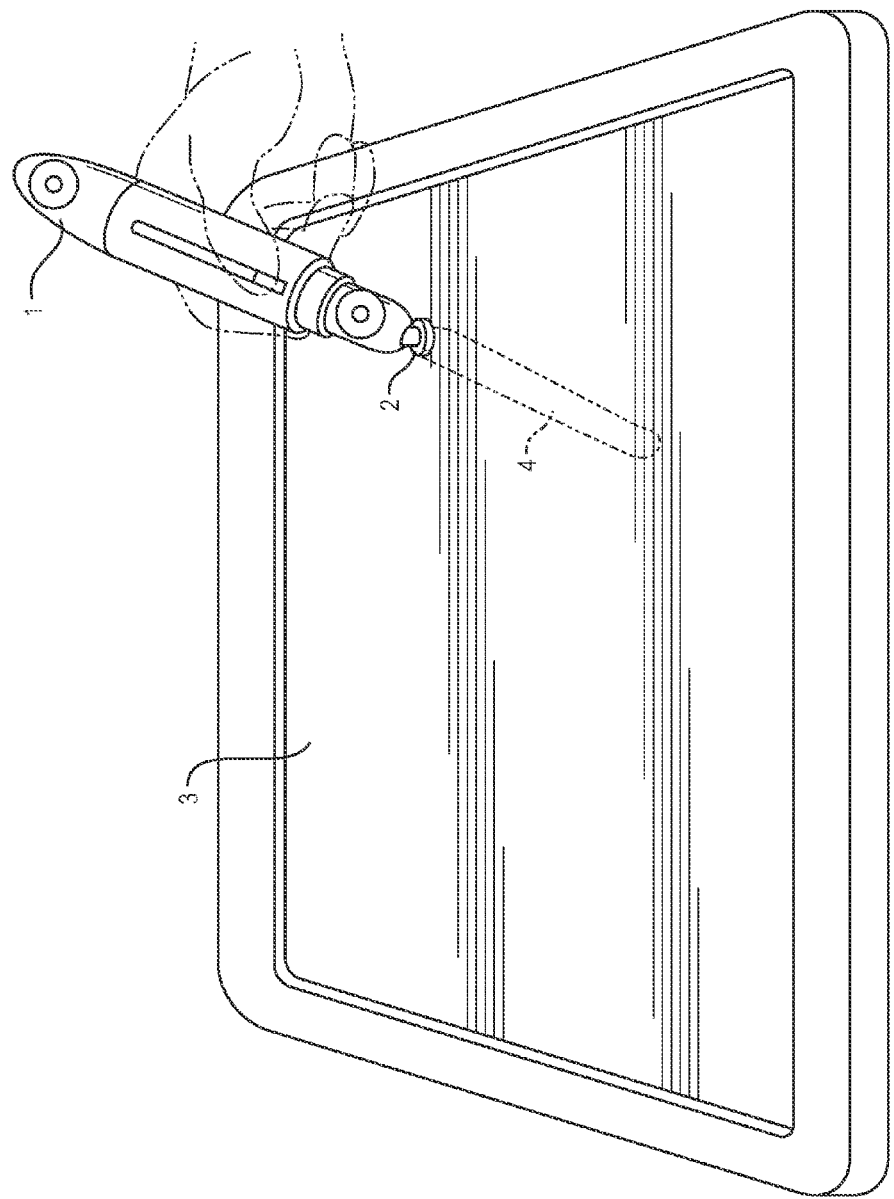
FIG. 2B depicts the same thing as FIG. 1, from a different perspective.

FIG. 2B depicts the same thing as FIG. 1, from a different perspective.

A note regarding an illustration convention used herein: For ease of illustration, in FIG. 2B, the virtual end 4 of the CID is displayed from the perspective of a viewer of FIG. 2B, rather than from the perspective of the user who is holding the CID. This illustration convention will generally be followed for the remaining Figures. However, in practice, virtual 3D objects (including the virtual end of the CID) are usually rendered on the display screen from the perspective of the user who is holding the CID. (In FIG. 1, the line of gaze of the user holding the CID and of a viewer of FIG. 1 coincide).

Figure 3:
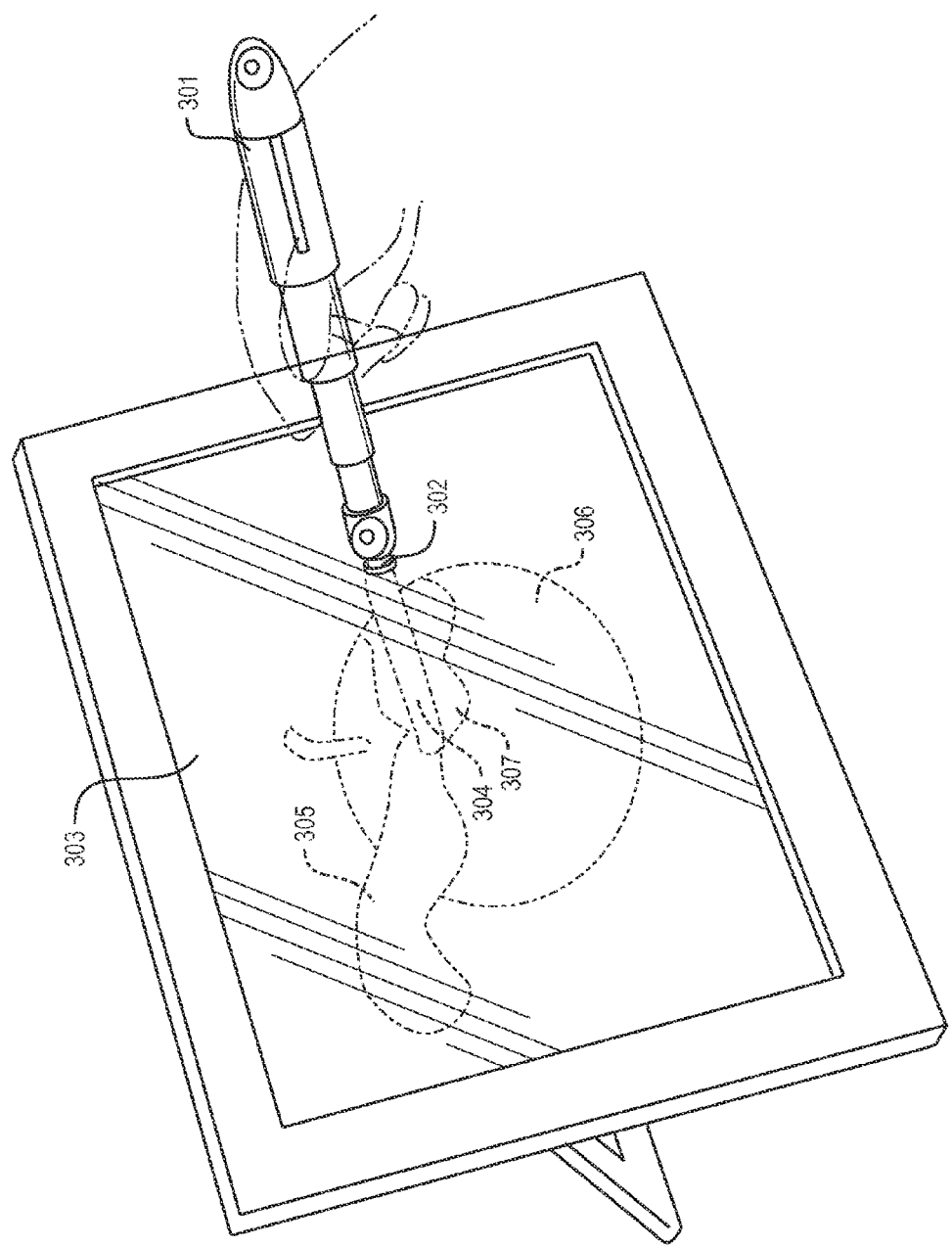
FIG. 3 shows a user holding a CID, and using it to carve a virtual 3D slice from a virtual 3D apple. The virtual cutting edge of the CID appears to project beyond the display screen into the virtual 3D space behind the screen.

FIG. 3 shows a user holding a CID 301 and pressing the tip 302 against the display screen 303. In FIG. 3, the user is using the virtual end 304 of the CID to carve a virtual 3D slice 305 from a virtual 3D apple 306, leaving a virtual 3D hole 307 where the slice used to be. The virtual end 304 of the CID appears to be serrated or saw-like. More generally, the virtual end of a CID may be used to cut away portions of a virtual 3D object, or otherwise subtract from the volume of a virtual 3D object.

Figure 4A:
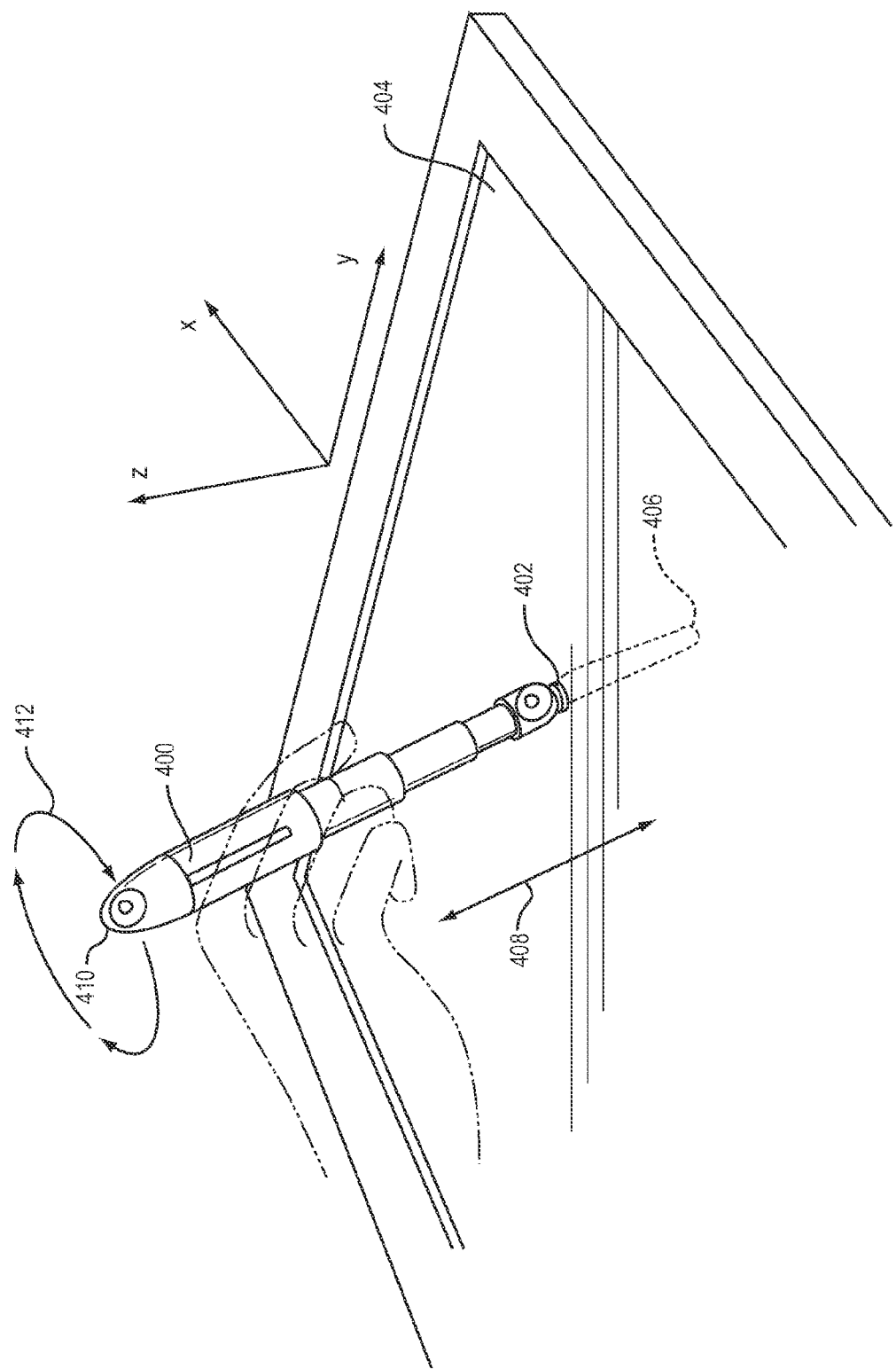
FIG. 4A shows various ways in which a CID may be moved.

FIG. 4A shows some ways in which a CID may be moved. In FIG. 4A, a user presses the tip 402 of a CID 400 against a display screen 404. While doing so, the user may change the tilt angle of the CID relative to the display surface. For example, the user may move the top 410 of the physical CID 400 in a circular orbit 412 while keeping the tip 402 in one place. In that case, the end 406 of the virtual portion of the CID appears to orbit in virtual 3D space in the opposite direction.

The pad at the end of the tip 402 is sticky or otherwise has a high coefficient of friction, which tends to prevent the tip 402 from slipping across the display screen as a user changes tilt angle. The tip may remain flat against the display screen even though the main body of the CID is tilted relative to the screen.

The CID telescopes. Thus, in FIG. 4, if the user presses the CID 400 against the display surface 404, the physical CID shortens in length, while the length of the virtual portion 406 of the CID appears to increase. The total apparent length of the CID, comprised of a physical portion and a virtual portion, remains the same (after taking into account foreshortening). Thus, the user experience is that, as the user holds the physical CID and pushes it toward a display screen, the end of the CID appears to be pushed through the display screen into the virtual 3D space beyond it. When the CID telescopes, it does so along its longitudinal axis, as indicated by arrow 408 in FIG. 4B.

Other movements are possible. For example, in FIG. 4A, a user may move the tip 402 of the CID laterally along the display surface 404 (e.g., along the x or y axes shown in FIG. 4A).

Figure 4B:
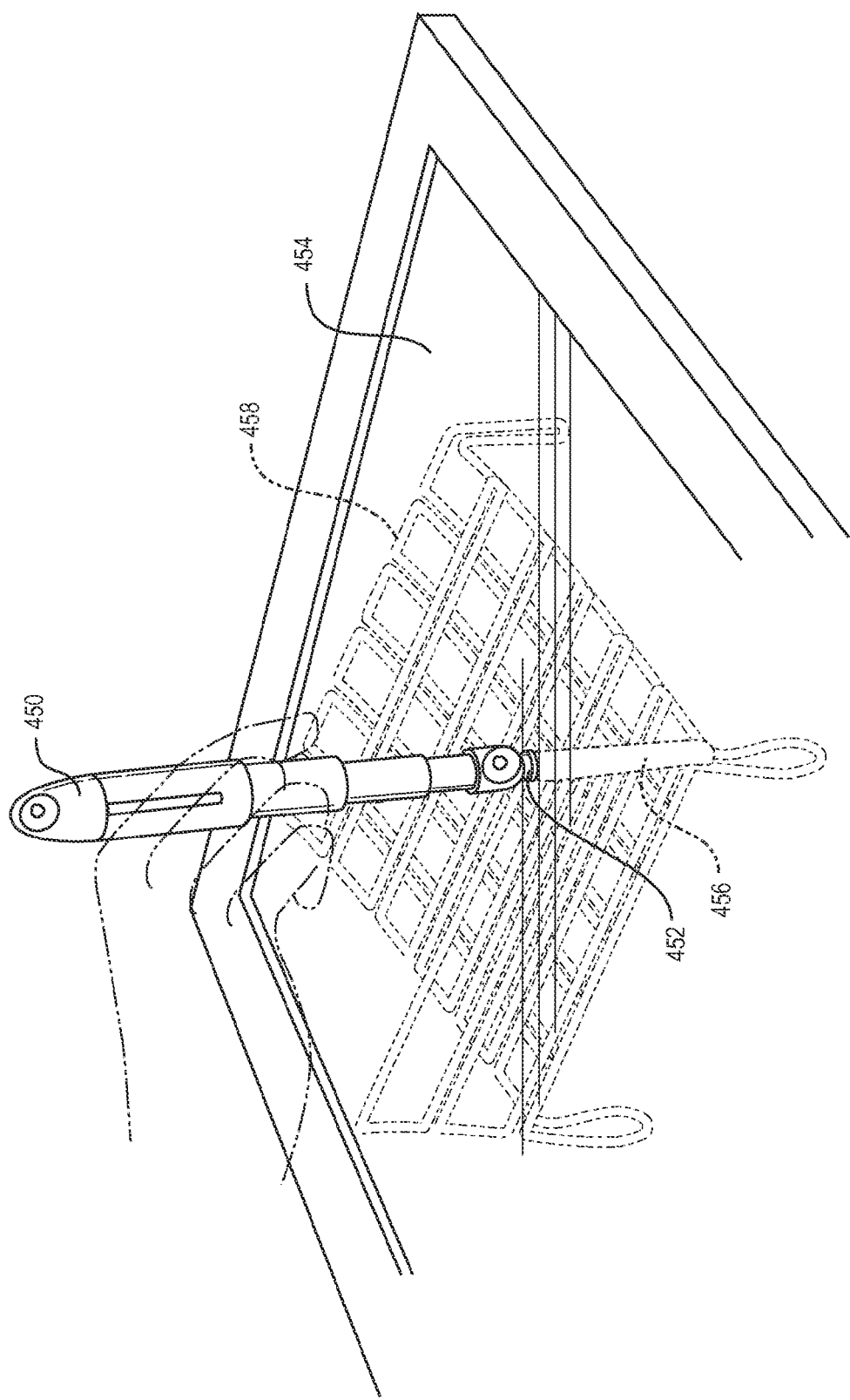
FIG. 4B shows the virtual end of a CID being used to draw a 3D virtual chair.

FIG. 4B shows the CID being used to make a 3D drawing. A user holds the tip 452 of a CID 450 against a display surface 454, and moves the virtual end 456 of the CID 450 to draw virtual 3D lines 458. In the example shown in FIG. 4B, the lines comprise a 3D drawing of a chair.

Figure 5A:
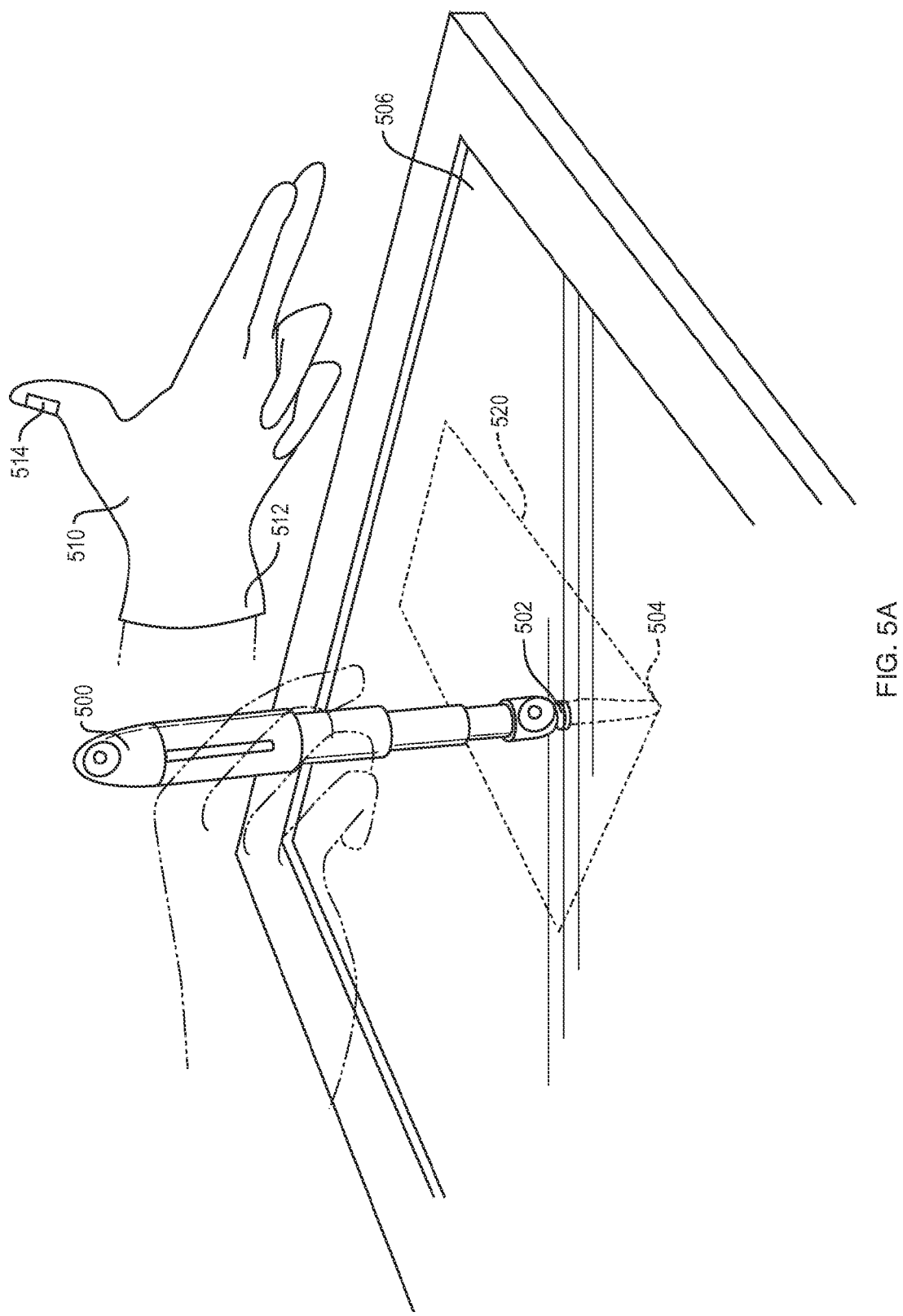
Figure 6A:
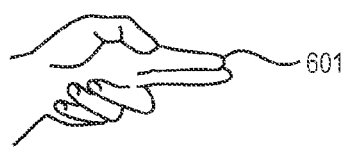
FIGS. 6A to 6F show different hand gestures that may be used as instructions for creating and manipulating various virtual shapes.
Figure 6B:
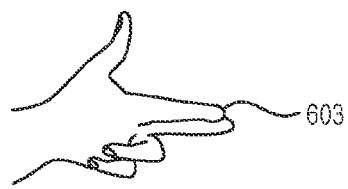
Figure 6C:
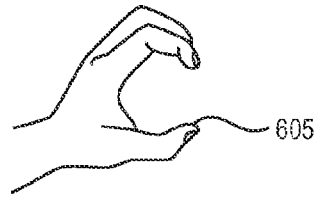
Figure 6D:
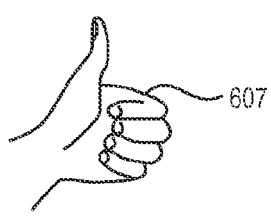
Figure 6E:
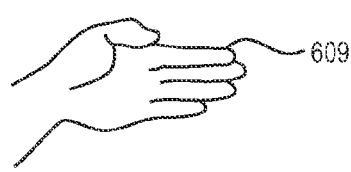
Figure 6F:
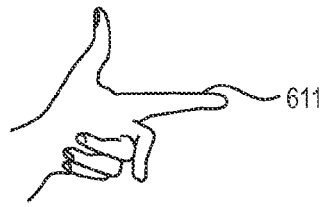

FIG. 5A to 5C show a user holding a CID in one hand, and making gestures with the other hand. The gestures cause different 3D virtual shapes to be formed. The CID may be used to position these shapes.

FIG. 5A shows a virtual square being created in this way. In FIG. 5A, a user holds a CID 500 in one hand. On the user's other hand 510, the user wears a glove 512. Fiducial markers 514, 516, 518 are affixed to the exterior of the glove's thumb and first two fingers. With this gloved hand 510, the user makes a gesture. In this case, the gesture is an instruction to form a square. A virtual square 520 is displayed. The virtual tip 504 of the CID is used to position the virtual square 520 thus formed. At least one camera is used to capture images of the gestures, and gesture recognition is performed by at least one processor.

FIG. 5B shows a virtual rectangular cuboid 550 being extruded in this way. In FIG. 5, the user has caused the cuboid to be extruded from the square shown in FIG. 5A.

FIG. 5C shows a virtual ellipsoid 560 being created in this way. The user is employing the virtual end 504 of the CID to position the ellipsoid 560 next to the rectangular cuboid 550.

FIGS. 6A to 6F show different hand gestures that may be used as instructions for creating and manipulating various virtual shapes. For example, the CID system may recognize the gestures shown in FIGS. 6A, 6B, 6C, 6D, 6E and 6F, respectively, as instructions to form a straight line, form a square, form an ellipse, extrude from an existing shape, lock a surface, or move in a specified direction.

Figure 7:
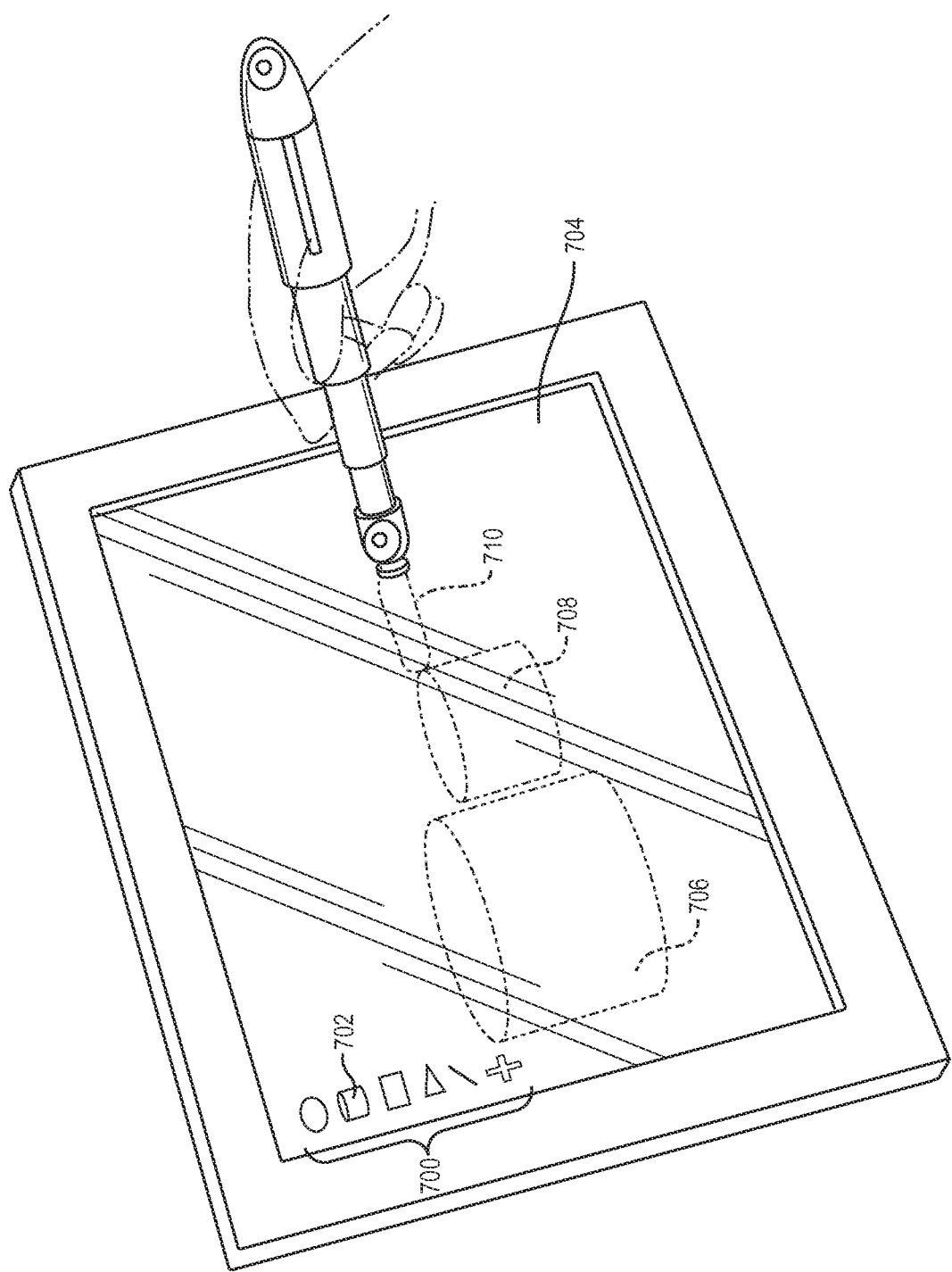
FIG. 7 shows a screen displaying a menu of shapes, from which a user may select in order to create different virtual 3D shapes.

FIG. 7 shows a screen displaying a menu of shapes, from which a user may select in order to create different virtual 3D shapes. A menu of shape icons 700 appears on the display screen 704. The user may select any of these icons in order to create a desired shape. In the example shown in FIG. 7, the user selected the cylinder icon 702 in order to form two virtual cylinders 706, 708. The virtual end 710 of the CID is used to position the cylinders in the virtual 3D space.

Figure 8B:
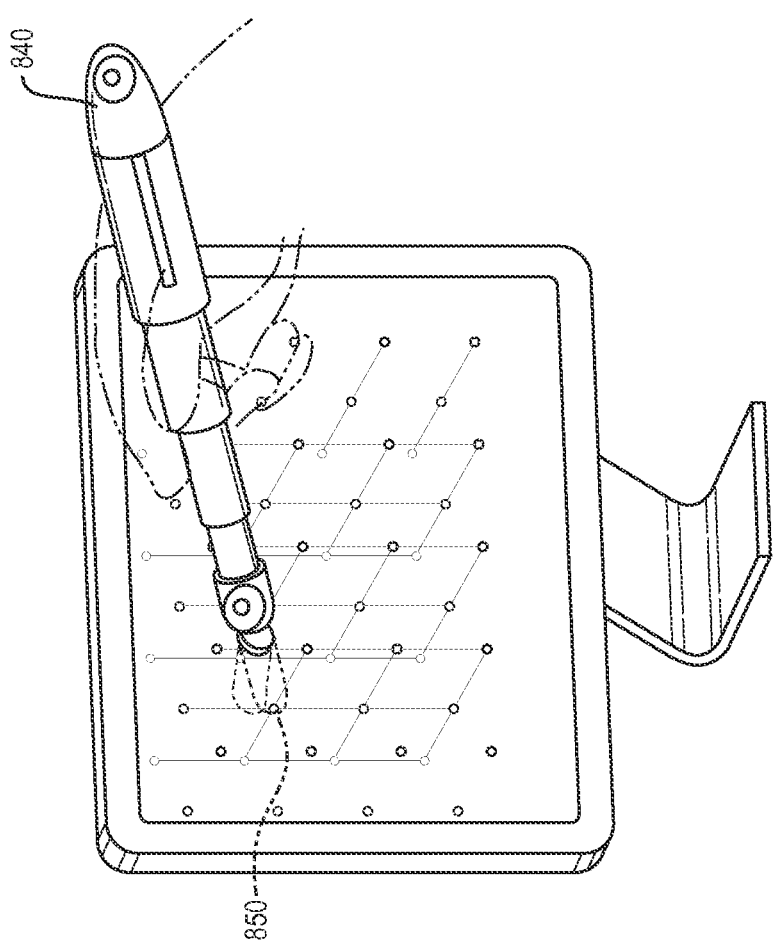
FIG. 8B shows a 3D grid feature being used with a CID.
Figure 8A:
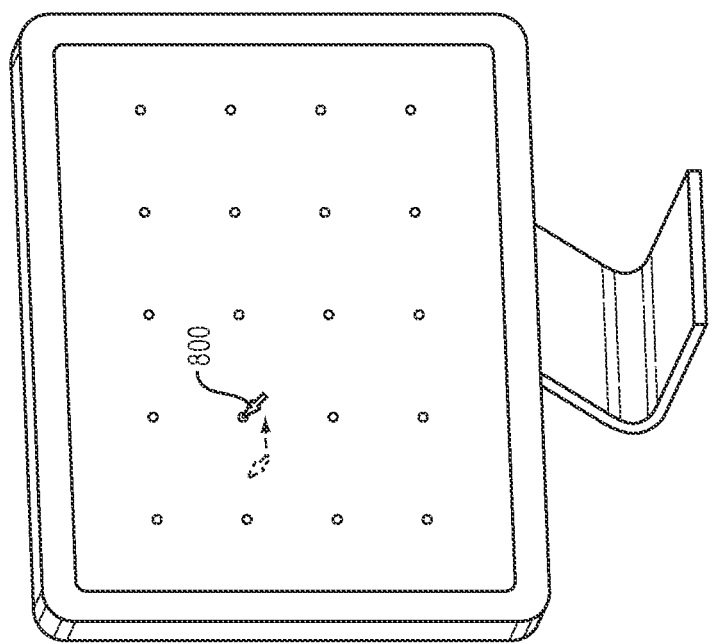
FIG. 8A shows existing technology (prior art), in which a CAD drawing program has a 2D grid feature.

FIG. 8A shows existing technology (prior art), in which a CAD drawing program has a 2D grid feature. When the grid feature is "on", the cursor "snaps" to a point 800 on a 2D grid when the cursor comes sufficiently close to that point.

FIG. 8B shows a 3D grid feature being used with a CID. As the virtual end of the CID comes close to a point 850 in a virtual 3D grid, the virtual end of the CID snaps to that point. This makes it easier to make 3D drawings with precise dimensions and precise alignment of the drawn objects.

Figure 9:
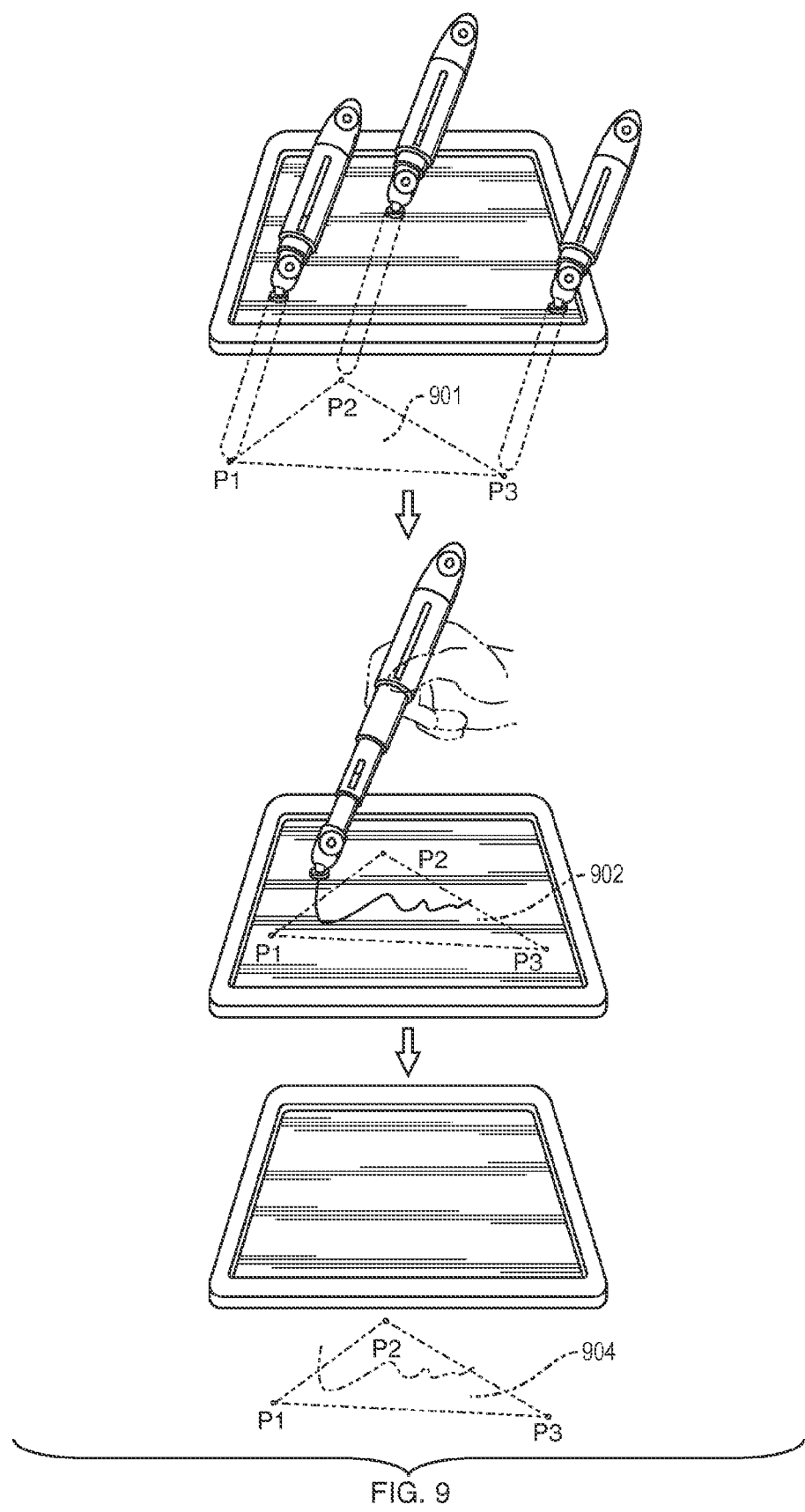
FIG. 9 shows a CID being used, first, to specify three 3D points to define a virtual 3D plane, second, to draw on that plane after it has been brought up to the virtual 2D surface of the display screen, and third, to reinsert the plane, with the drawing on it, into virtual 3D space.

FIG. 9 shows a CID being used, first, to specify three points P1, P2, P3 to define a virtual 3D plane 901, second, to draw on that plane after it has been brought up to the virtual 2D surface 902 of the display screen, and third, to reinsert the plane, with the drawing on it, into virtual 3D space at position 904. This has the advantage of allowing users to draw on a flat surface in 2D space, which may be easier because issues such as foreshortening may be avoided. Then the drawing on a flat plane may put back into 3D space (e.g., in a virtual orientation that is not parallel to the display surface).

Figure 10:
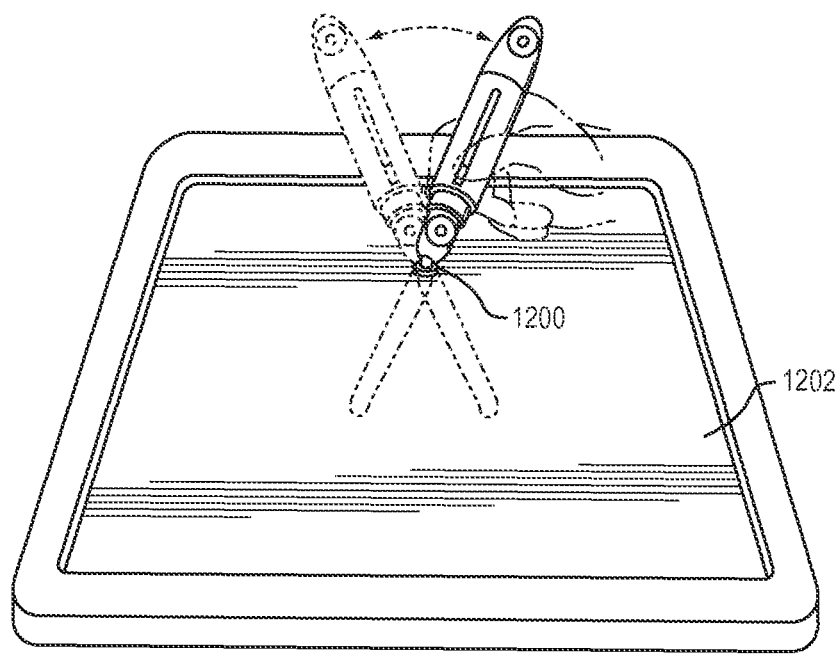
FIG. 10 shows how a user may tilt a CID back and forth.

FIG. 10 shows how a user may tilt a CID back and forth. By rocking the physical CID back and forth while holding the tip 1200 in place on a display surface 1202, the user causes the virtual end of the CID to tilt back and forth.

Figure 11:
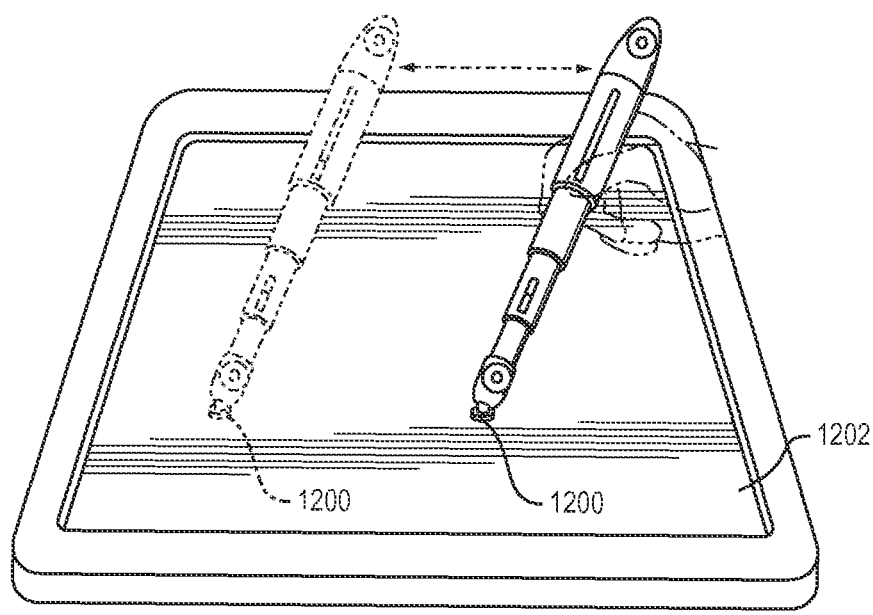
FIG. 11 shows how a user may move a CID laterally along a display surface.

FIG. 11 shows how a user may move the tip 1200 of a CID laterally along a display surface 1202.

Figure 12A:
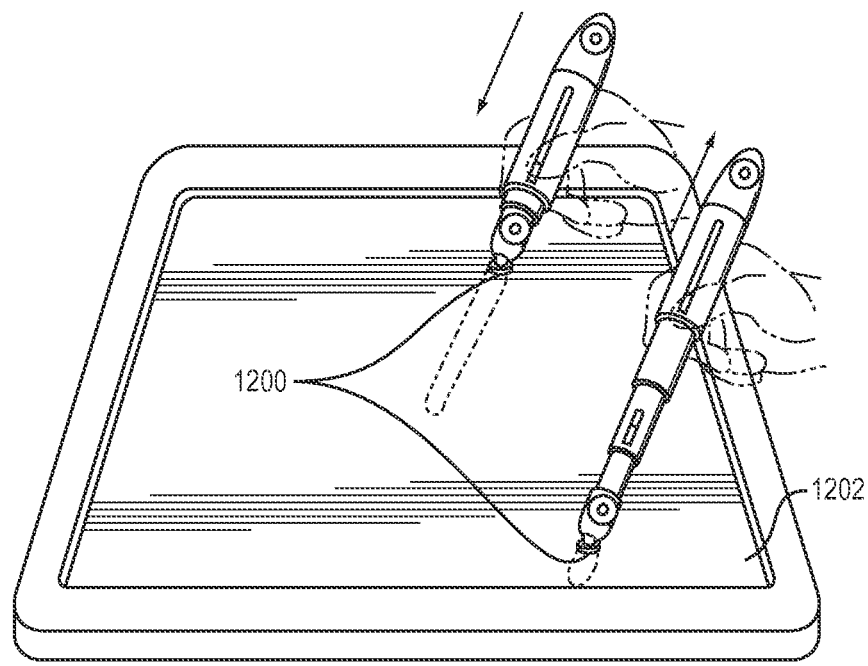
FIG. 12A shows how the physical length of a CID may be shortened, while the virtual end of CID lengthens, or vice versa.

FIG. 12A shows how the physical length of a CID may be shortened, while the virtual end of a CID lengthens, or vice versa. This may occur as a user presses a tip 1200 of the CID against a display screen 1202, or as an actuator provides haptic feedback.

Figure 12B:
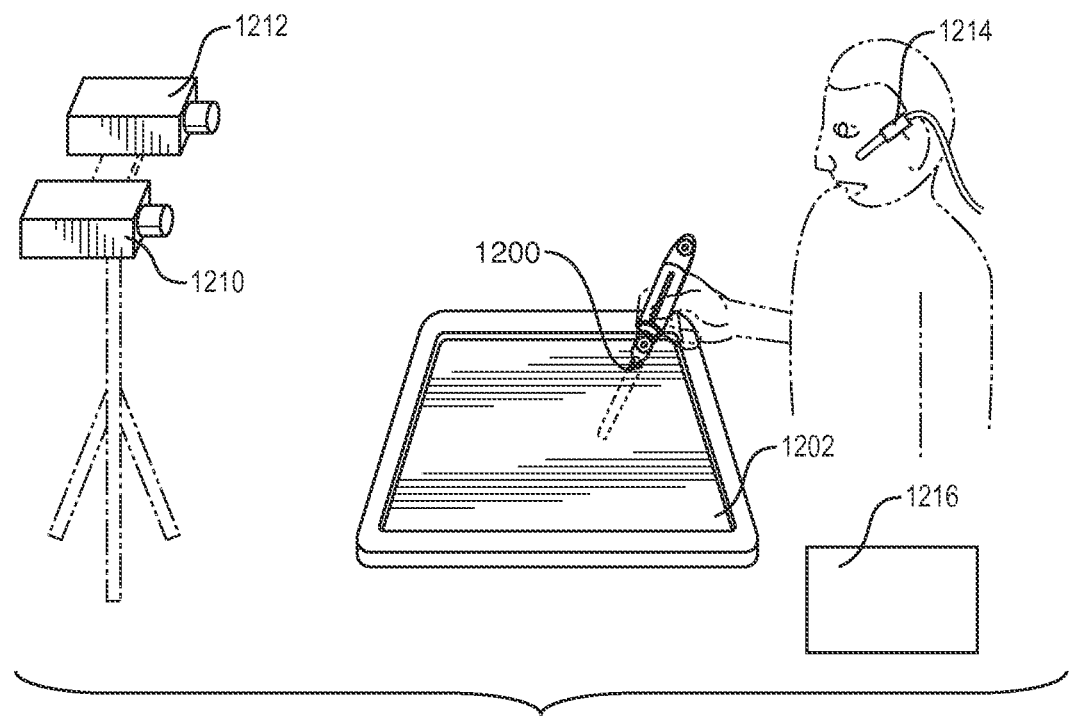
FIG. 12B shows a system in which a user's head position is estimated by stereo infrared cameras. The user's head position is used to calculate the angle of the user's view into the virtual 3D space beyond the display screen.

FIG. 12B shows a system in which a user's head position is tracked by stereo infrared cameras 1210 and 1212. The user wears an ear-mounted infrared LED 1214. At least one processor 1216 uses the camera images to determine the user's head position relative to the display screen, and based on that head position, to calculate the angle of the user's view into the virtual 3D space beyond the display screen.

Figure 12C:
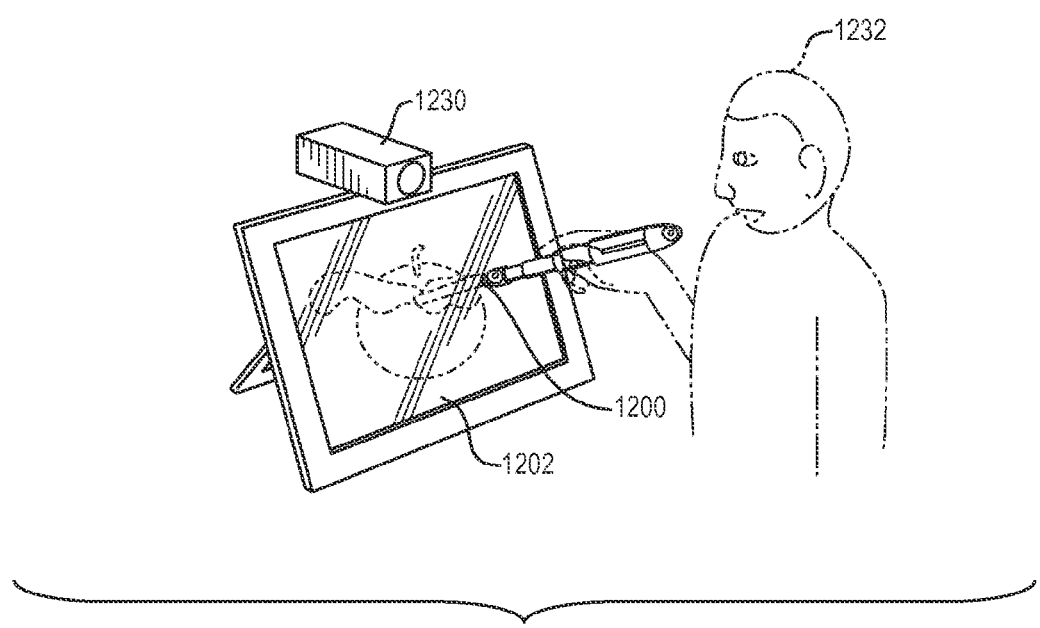
FIG. 12C shows a system in which a user's head position is tracked using a single camera and face recognition.

FIG. 12C shows a system in which a user's head position 1232 is tracked using a single camera 1230 and face recognition.

Figure 13:
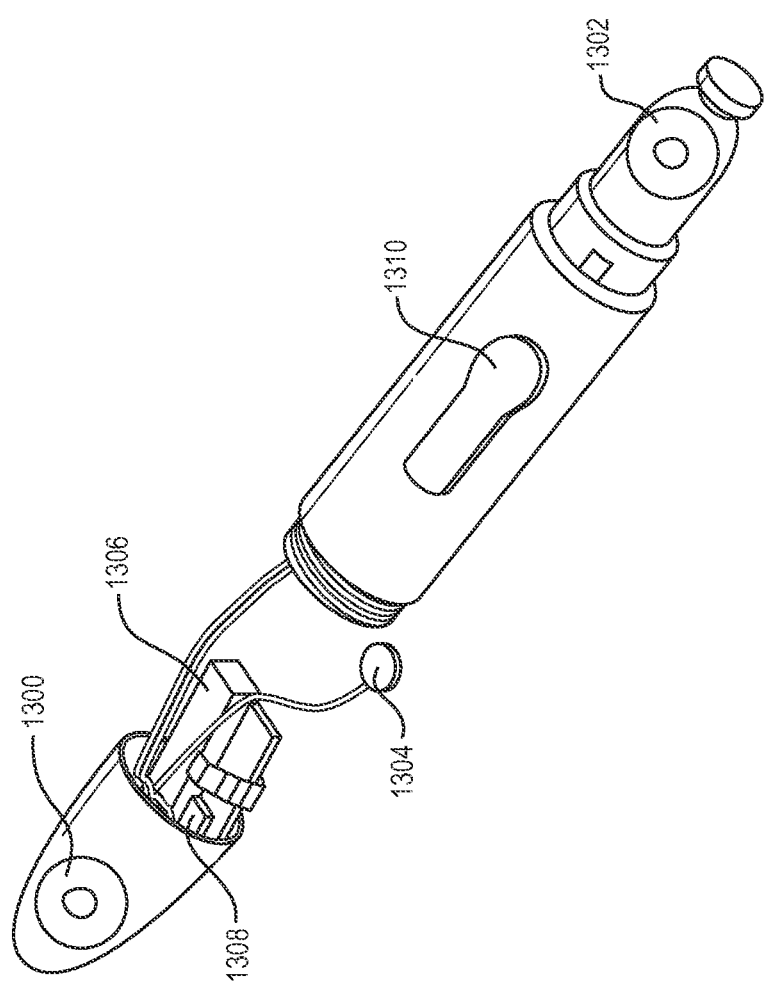
FIG. 13 shows a prototype in which reflective IR tags on the CID are used to determine the length, position and orientation of the CID.

FIG. 13 shows a prototype in which reflective IR tags on the CID are used to determine the length, position and orientation of the CID. The reflective IR tags 1300, 1302 are affixed near the ends of the CID.

In FIG. 13, a push-button 1310 provides click and drag features. The push button is advantageous because it allows a user to indicate the beginning and ending of an interaction, and facilitates interactions such as selection and dragging of objects. The push button may be adapted to accept input from a user indicative of a variety of instructions.

In addition, FIG. 13 shows certain internal hardware of a CID prototype. This hardware includes a microcontroller 1306 for, among other things, controlling a vibration motor 1304 for haptic feedback. It also includes a bluetooth communications unit 1308 (including at least one transceiver) for communicating with at least one remote processor, which remote processor may in some cases be housed with or adjacent to the display screen. That remote processor may, for example, perform the rendering and other functions of the Java machine described in FIG. 26.

Figure 14:
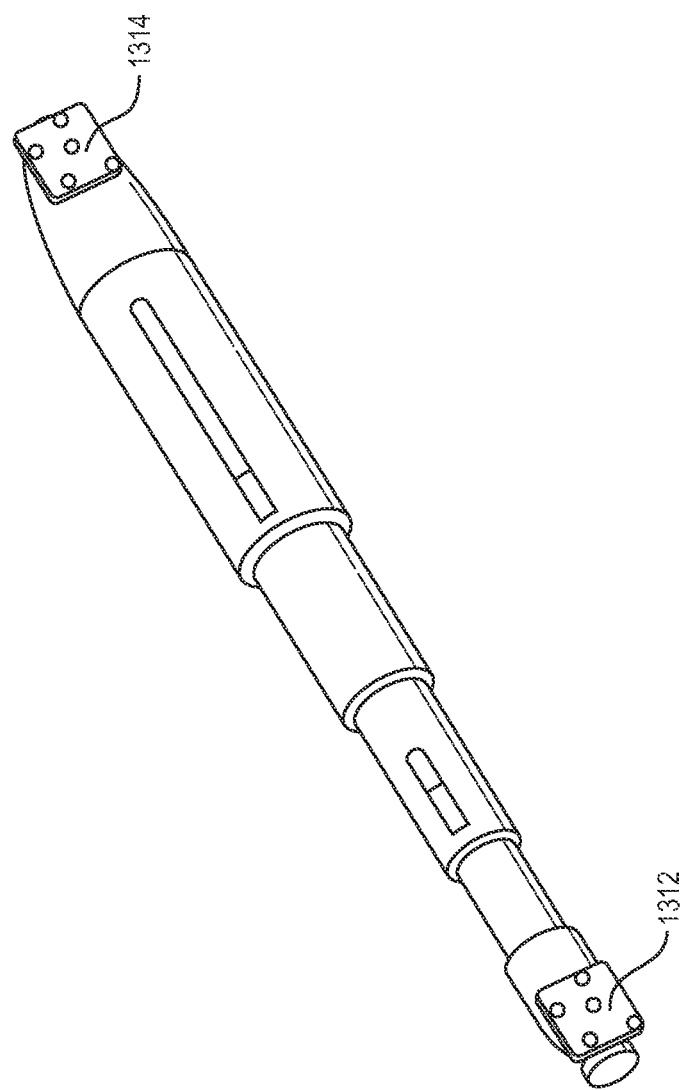
FIG. 14 shows the same prototype, with the mounts for the IR tags exposed.

FIG. 14 shows the same prototype as FIG. 13, with the mounts 1312, 1314 for the IR reflective tags exposed.

Figure 15:
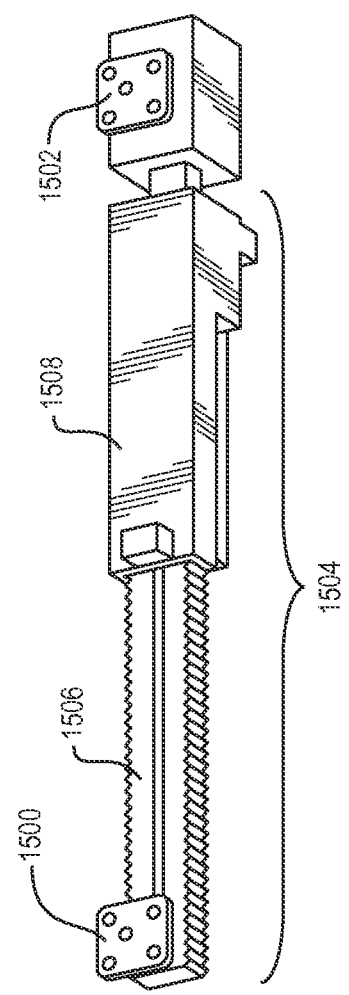
FIG. 15 shows the shaft for an actuator and linear potentiometer, in a prototype.

FIG. 15 shows an embodiment of this invention, in which a moveable shaft 1508 transmits force from an actuator. The movement of the shaft 1508 is measured by a linear potentiometer to determine the length of the CID. The linear potentiometer and actuator are housed in housing 1508. Mounting stages 1500, 1502 for IR reflective tags are affixed near the ends of the CID. In the example shown in FIG. 15, the IR reflective tags are used to determine orientation of the CID.

Figure 16:
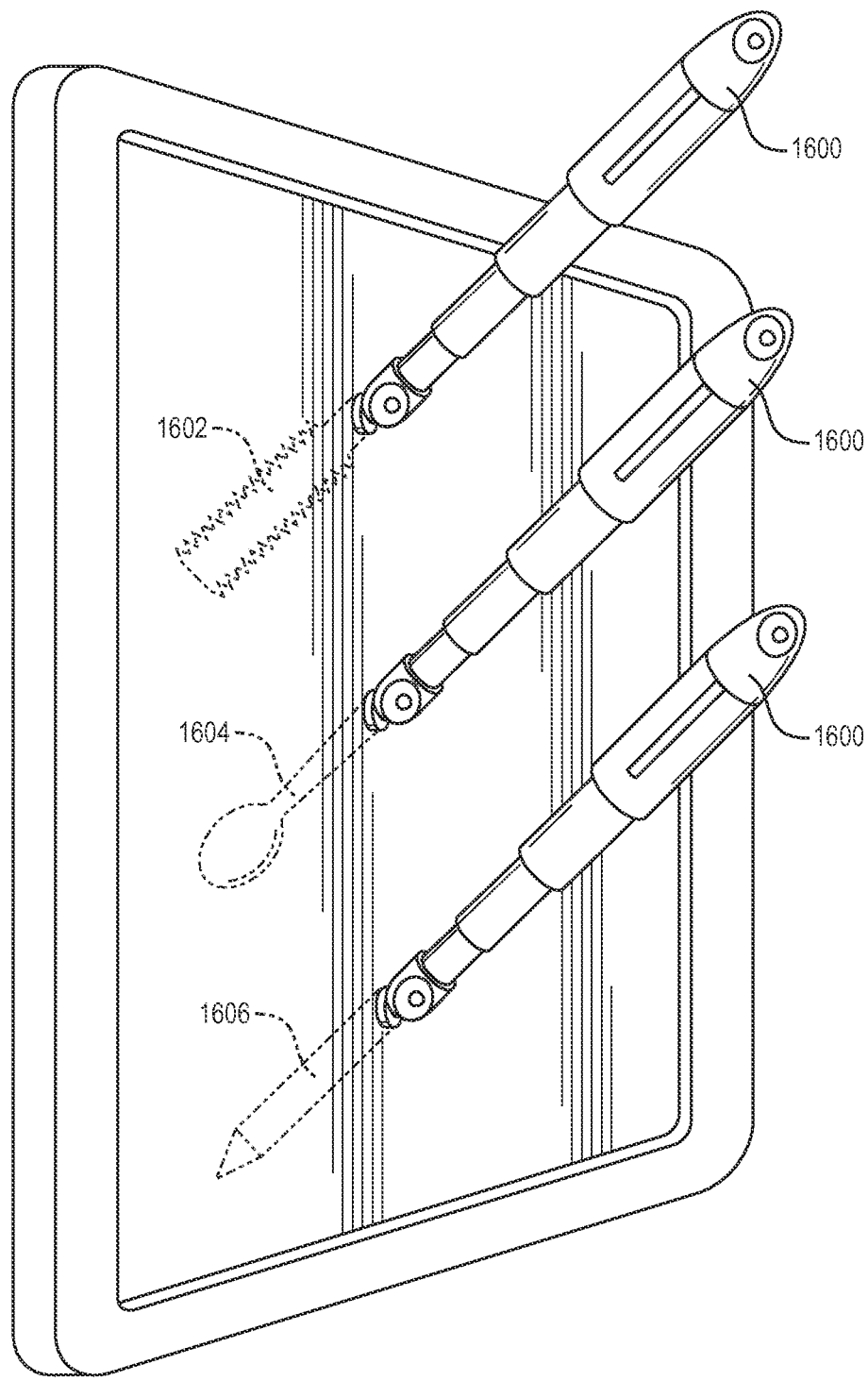
FIG. 16 shows how the shape of the virtual end of the CID may change.

FIG. 16 shows examples of how the shape of the virtual end of the CID may change. The same physical CID 1600 may at different times appear to project a virtual shape in the form of a serrated saw 1602, a spoon 1604, or a pencil 1606. The functionality of the CID may change appropriately. For example, the saw 1602 may be used for virtual cutting, the spoon 1604 for scooping material away from a virtual object, and the pencil 1606 for virtual drawing.

FIG. 17 is a diagram of a prototype extended to full length. In this prototype, a circuit 1704 generates a magnetic field that is sensed by magnetic coils in a display screen (not shown in FIG. 17), in order to detect the tilt of the CID relative to the display screen and the 2D position of the CID tip 1700 relative to that screen. The CID has telescoping parts, including housing part 1702. As the CID telescopes (increasing or decreasing in length) a connecting rod 1704 moves. That movement is sensed by a linear potentiometer 1706. As the CID collapses, a spring 1708 provides some resistance felt by the user.

Figure 17A:
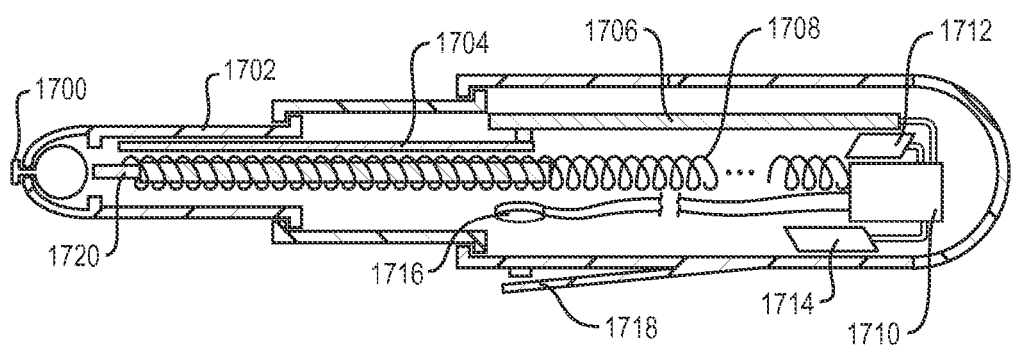
FIG. 17A is a diagram of a prototype in which the tip position and orientation of the CID are determined by magnetic sensors.

In FIG. 17A, a push button 1718 is adapted to accept input from a user, including input regarding click and drag, and input regarding when an operation starts and ends. A microcontroller 1710 controls a vibration motor 1716 for providing haptic feedback. A bluetooth communications unit 1714 communicates with at least one remote processor, as described in more detail with respect to FIG. 13. A battery 1712 provides power for the electronics in the CID.

Figure 17B:
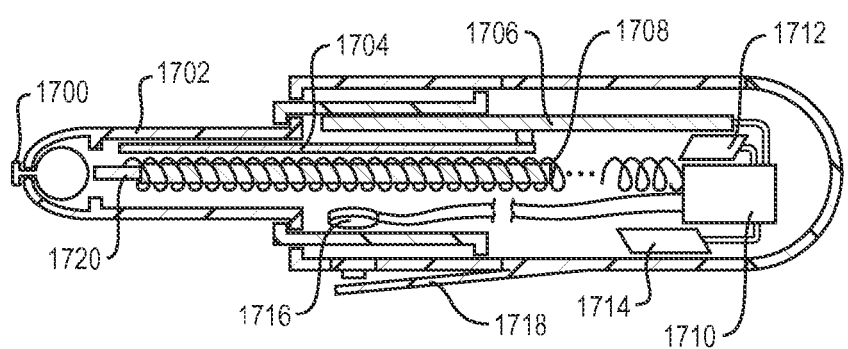
FIG. 17B is a diagram of the same prototype, with the prototype collapsed to a shorter physical length.

FIG. 17B is a diagram of the same prototype as in FIG. 17A, with the prototype collapsed to a shorter physical length.

Figure 18B:
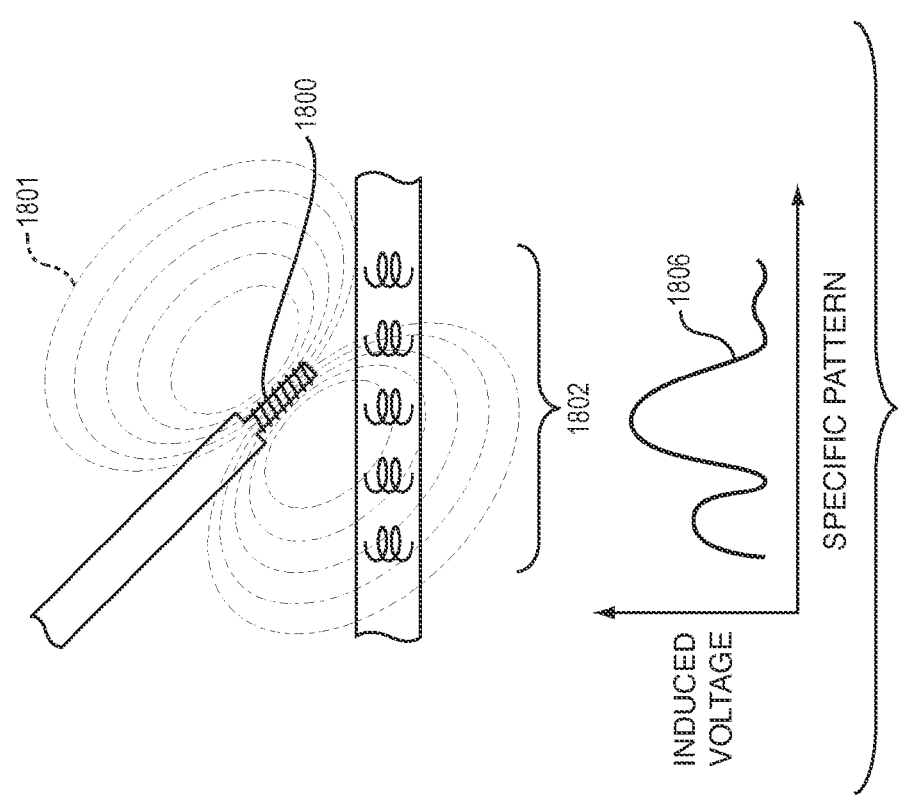
FIGS. 18A and 18B are diagrams showing sensor coils in a display screen. The sensor coils are used to detect changes in a magnetic field as a CID changes its tilt angle and 2D position relative to the display screen.
Figure 18A:
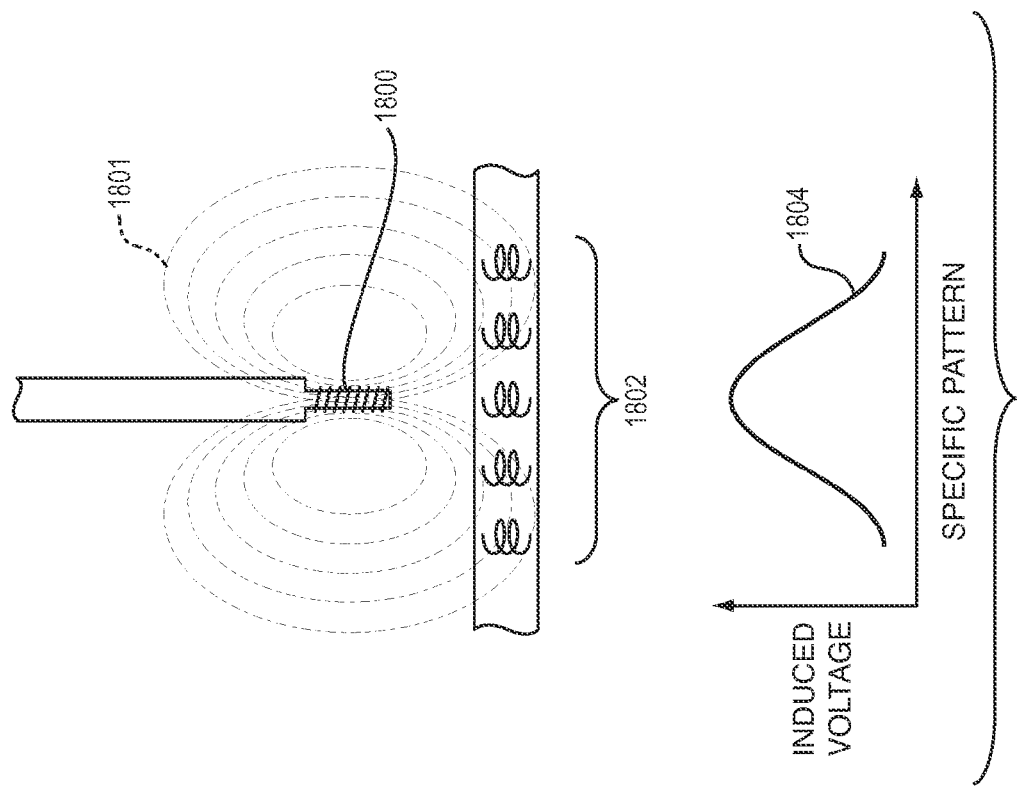

FIGS. 18A and 18B are diagrams showing a magnetic sensing system for detecting the 2D position and tilt angle of the CID relative to a display surface. A magnetic field 1801 created by a resonance circuit or coil in the tip 1800 of the CID induces voltage in sensor coils 1802 in the display surface. As the CID changes position or orientation, the magnetic field changes, and different patterns of induced voltages 1804, 1806 result. Based on these patterns, the 2D position and orientation of the CID relative to the screen may be determined. This method of magnetic sensing (in a context other than a CID) is described in U.S. Pat. No. 5,748,110, the entire disclosure of which is incorporated by reference herein.

Figure 19:
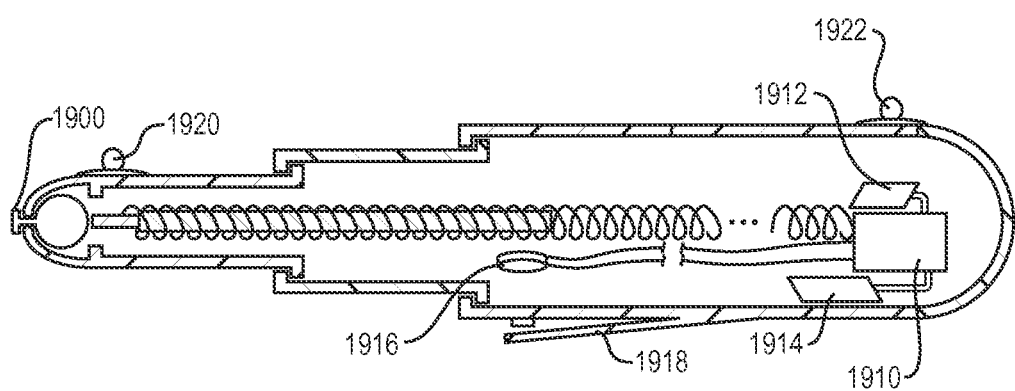
FIG. 19 is a diagram of a cross-section of a prototype, in which the position, length and orientation of the CID are determined by tracking the position of reflective RF tags on the CID.

FIG. 19 is a diagram of a cross-section of a prototype, in which the length, orientation and position of the CID is determined by tracking the position of reflective RF tags 1920 and 1922 on the CID. In this prototype, the microcontroller 1910, blue tooth communications unit 1914, battery 1912, push button 1918, vibratory motor 1916 and pad 1900 at the tip of the CID correspond in structure and function to items 1700, 1710, 1714, 1712, 1718 and 1716 in FIG. 17, which items are described above.

Figure 20A:
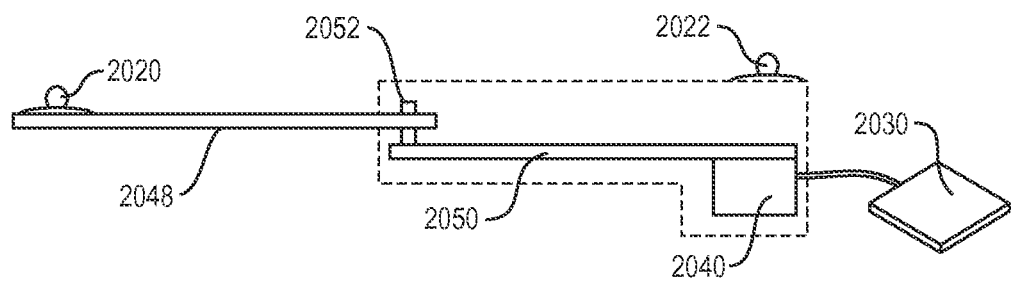
FIGS. 20A and 20B show a linear potentiometer for measuring the length of a telescoping CID.
Figure 20B:
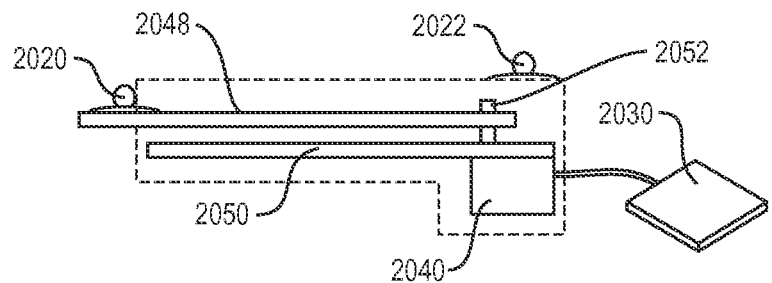

FIGS. 20A and 20B show a linear potentiometer/actuator unit, in some embodiments of this invention. A connecting rod 2048 moves as the CID telescopes in and out. The movement of rod 2048 is detected by linear potentiometer 2052, 2050, in order to determine the length of the CID. A motor 2040 may be used to actuate movement of rod 2048, for haptic feedback. An IC chip 2030 is used to control the motor 2040. The CID may telescope for reasons other than actuation by motor 2040. For example, it may increase in length due to force from a spring, or decrease in length as a user presses the CID against a display surface. IR reflective tags 2020 and 2022 may be mounted on the housing of the CID. As rod 2048 moves, the telescoping part of the housing to which tag 2020 is affixed moves with it.

In FIG. 20A, the CID is extended to full physical length. In FIG. 20B, the CID is collapsed to a shorter length.

Figure 21:
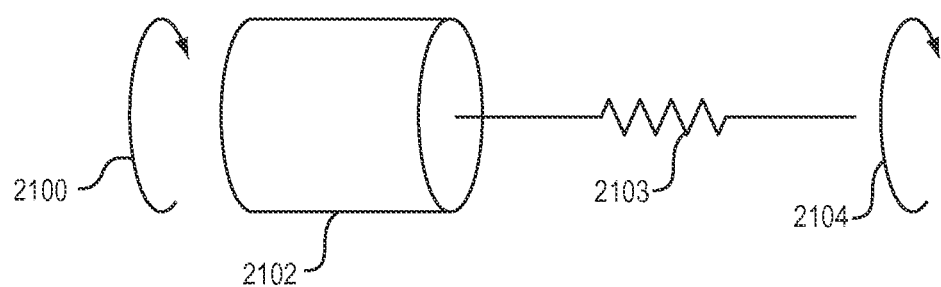
FIG. 21 is a diagram of a series elastic actuator for haptic feedback in a CID.

FIG. 21 is a diagram of a model of a series elastic actuator (SEA) for haptic feedback in a CID. By using an SEA, accurate force feedback can be achieved dynamically regardless of the spring retraction. As shown in FIG. 21, an SEA may be implemented whereby torque 2100 from a motor is applied to a mass 2102, causing a motor shaft to move, which transmits force through a spring 2103, resulting in an outputted force 2104.

In exemplary embodiments of this invention, haptic feedback is employed to heighten the illusion that the CID is directly interacting with virtual 3D objects in the virtual space beyond the display screen. For example, the CID may vibrate when the virtual end of the CID contacts a virtual object. Or, for example, the virtual end of a CID may be used to draw on a virtual tilted surface (i.e., a virtual surface whose apparent depth beyond the screen varies). As the virtual end of the CID moves from a lower point to a higher point 4 on the tilted surface, a linear actuator may provide haptic feedback by lengthening the physical CID, so that it feels to a user as if the CID is rising as it goes up the tilted surface.

Figure 22:
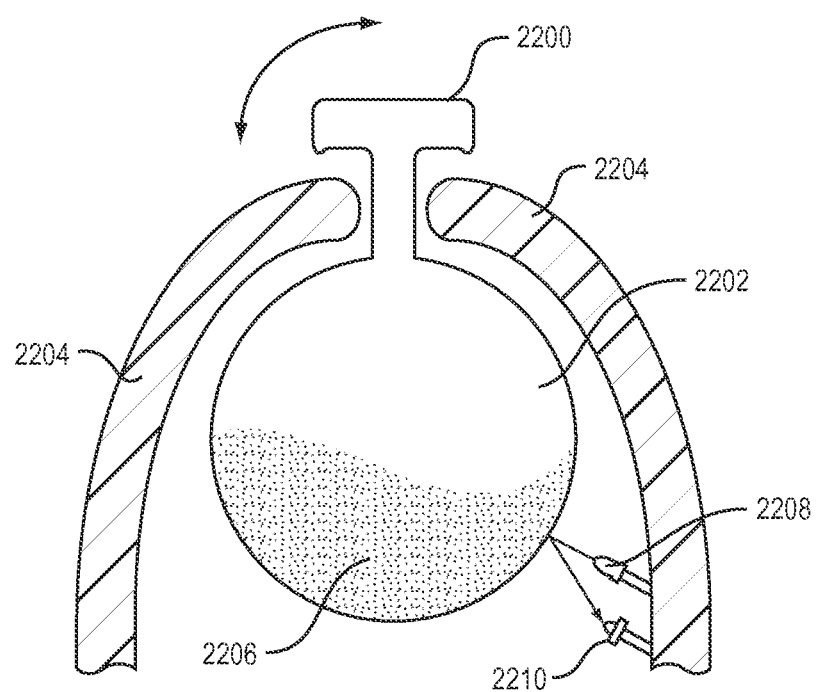
FIG. 22 shows a cross-section of the end of a CID that is generally closest to the display screen. It includes a light sensor for optically sensing the orientation of the CID.

FIG. 22 shows a cross-section of the end of a CID that is generally closest to the display screen. Sufficient space is left between the housing 2204 and a sphere 2202, so that the sphere 2202 can tilt up to 30 degrees from the longitudinal axis of the CID in any direction. This allows a user to change the orientation of the CID relative to a display screen, while leaving the pad 2200 at the tip of the CID in a single place on the display screen. This pad 2200 at the tip of the CID may remain flat against the display while the tilt angle of the main body of the CID changes.

The movement of the sphere relative to the housing of the CID may be optically sensed, in order to determine the tilt angle of the CID relative to the display surface. A light source 2208 emits light that reflects off of the sphere 2202 and is detected by a light sensor 2210. As the sphere 2202 moves relative to the housing 2204, the pattern of dots 2206 on the surface of the sphere that are illuminated by the light source 2208 changes, thereby affecting the reflected light detected by the light sensor 2210. From these changes in reflected light, the orientation of the CID relative to the display surface may be determined.

Figure 23:
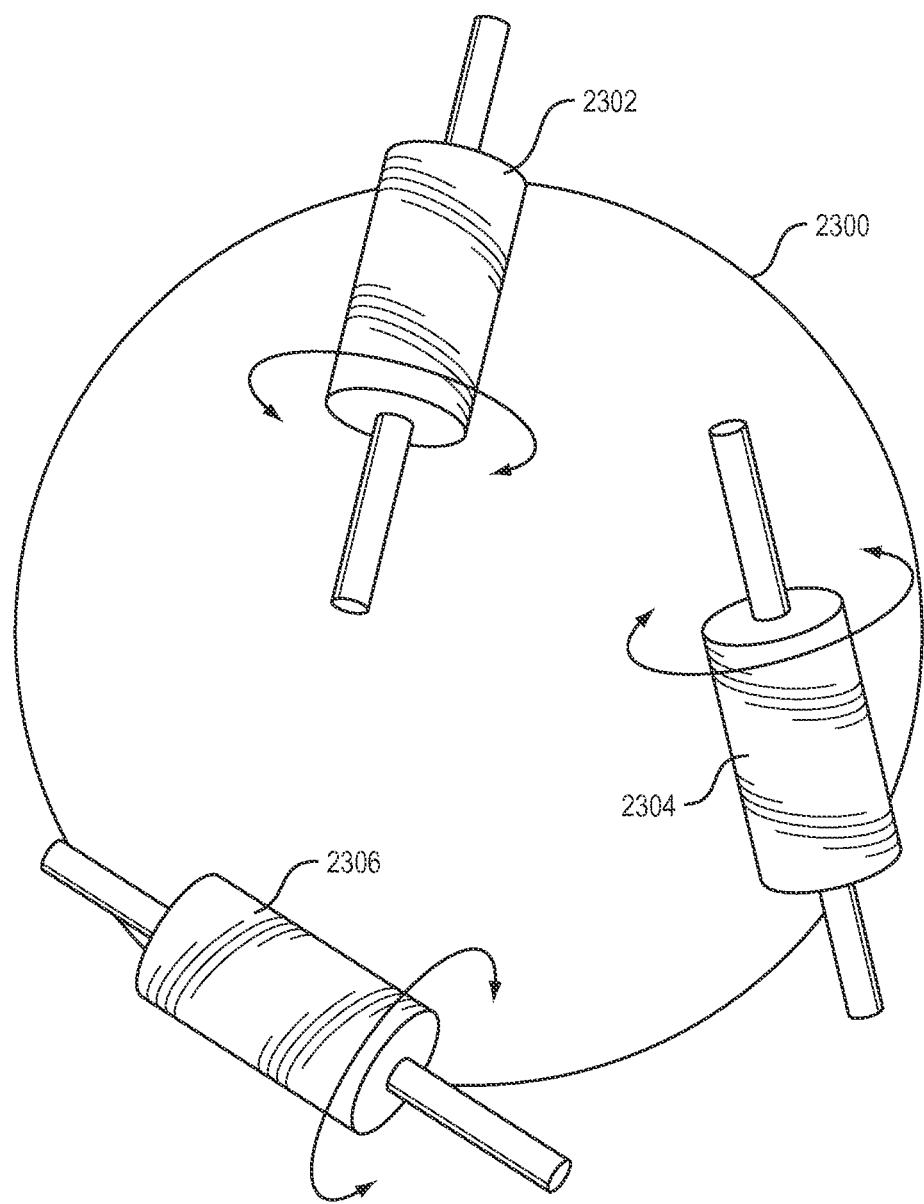
FIG. 23 is a diagram that shows hardware for mechanically sensing the orientation of a CID.
Figure 24A:
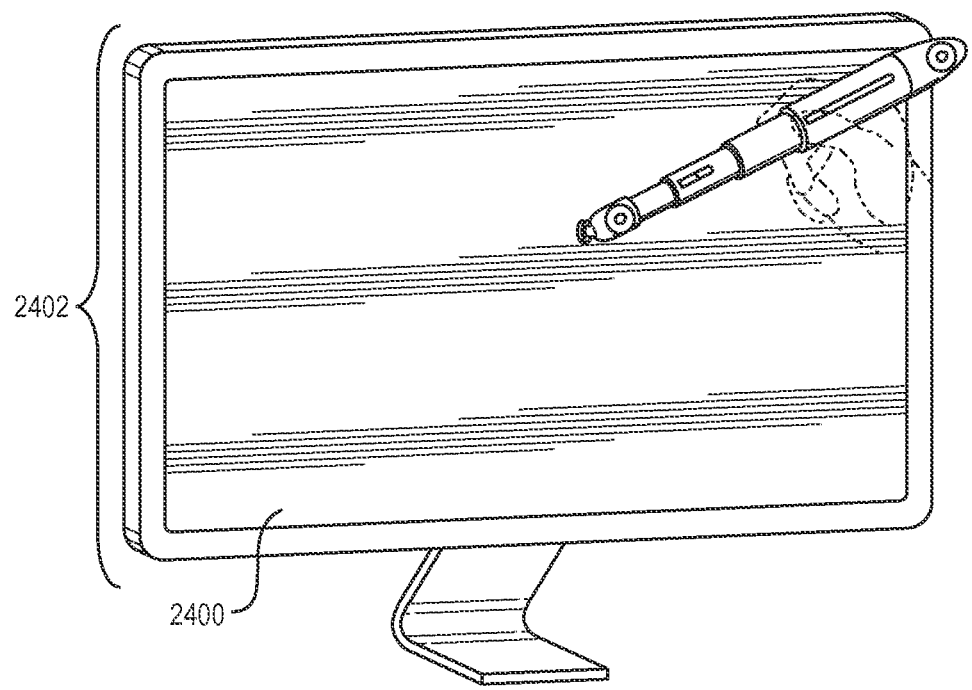
FIGS. 24A to 24D show how the display screen may be implemented in various form factors. The form factors shown in FIGS. 24A, 24B, 24C and 24D, respectively, are a computer monitor, a table-mounted display, a wall-mounted display, and a handheld tablet computer.
Figure 24B:
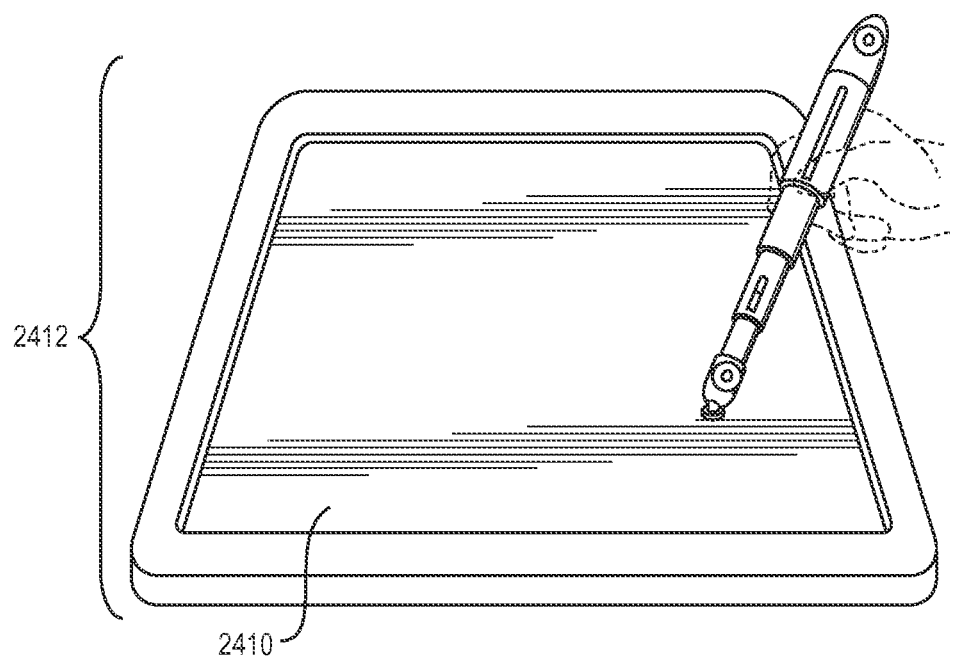
Figure 24C:
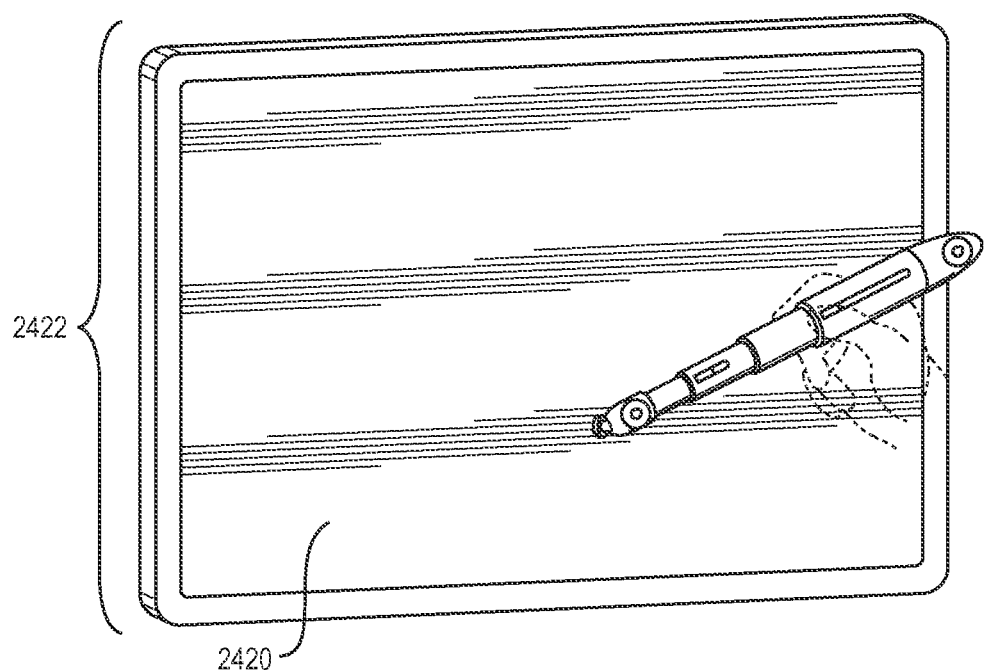
Figure 24D:
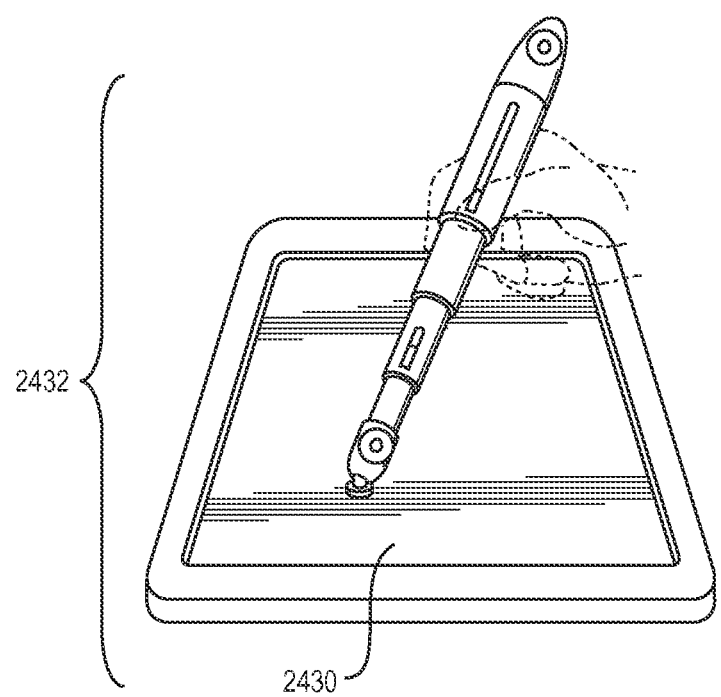

Alternately, rotation of the sphere may be mechanically sensed. For example, as shown in FIG. 23, the rotation of the sphere may mechanically cause elements 2302, 2304, 2306 to move, and the movement of these elements 2302, 2304, 2306 may be measured.

In addition, the orientation and/or position of the CID may be determined in other ways. For example, the tilt angle of the CID may be detected by gyroscopes and changes in lateral position or orientation of the CID may be detected with accelerometers.

FIGS. 24A to 24D show how a display screen 2400, 2410, 2420, 2530 may be implemented in various form factors. The form factors shown in FIGS. 24A, 24B, 24C and 24D, respectively, are a computer monitor 2402, a table-mounted display 2412, a wall-mounted display 2422, and a handheld tablet computer 2432.

FIGS. 25A to 25D show some alternate ways of implementing 3D display for use with a CID.

Figure 25B:
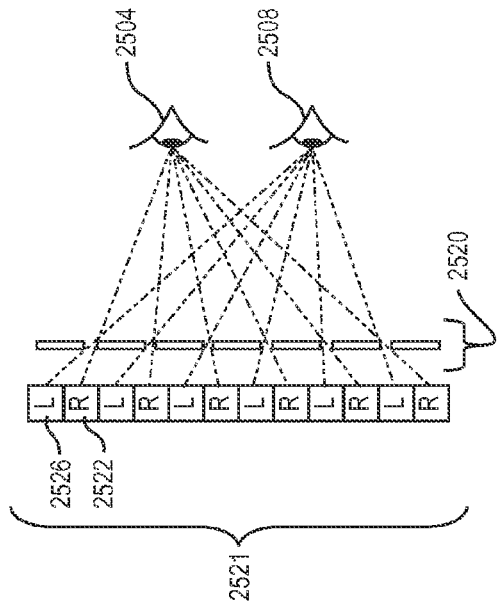
FIGS. 25A to 25D show alternate ways of implementing 3D display for use with a CID.
Figure 25D:
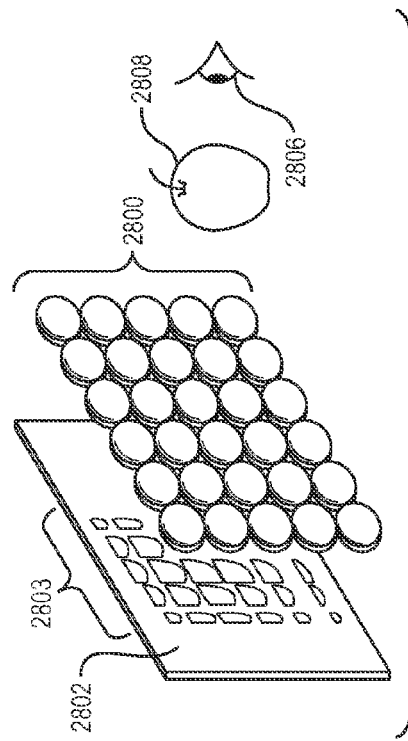
Figure 25A:
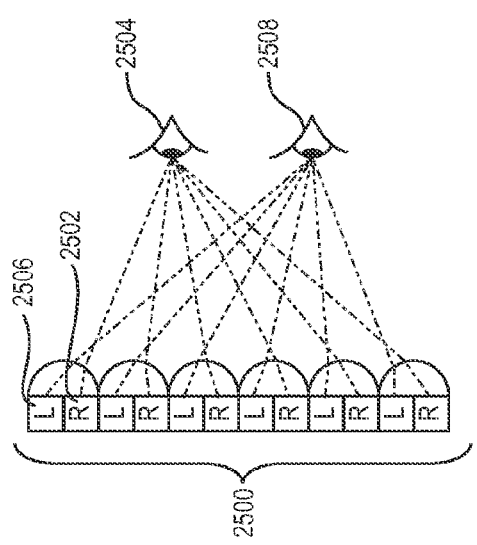

FIG. 25A shows lenticular lenslets for 3D display for use with a CID. An array of lenticular lenslets 2500 in a display surface refracts light so that the right eye 2504 and left eye 2508 of a user see different pixels, e.g., pixels 2502 and 2506.

FIG. 25B shows a parallax barrier for 3D display for use with a CID. Light from an array of pixels 2521 in a display surface passes through gaps in the parallax barrier 2520. The pixels and parallax barrier are arranged so that different pixels, e.g., 2526 and 2522, are seen by a viewer's right eye 2504 and left eye 2508.

Figure 25C:
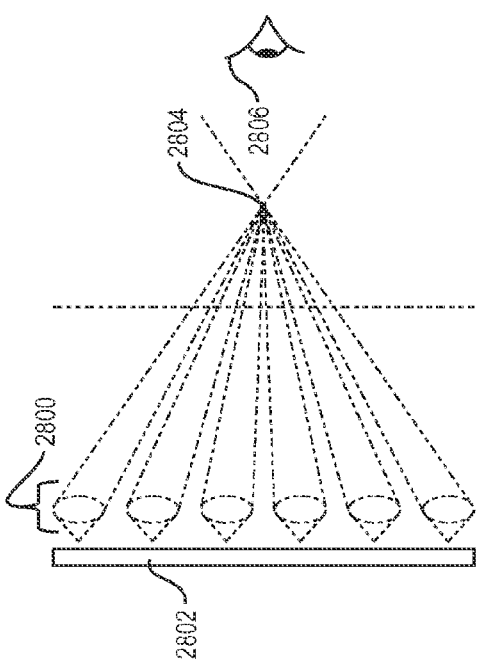

FIGS. 25C and 25D show integral imaging. A display screen 2802 displays elemental images 2803. The light from these elemental images 2803 is refracted by an array of lenslets 2800, causing a real image 2808 to appear at a convergence point 2804 between the user's eye 2806 and the lenslets.

Figure 26:
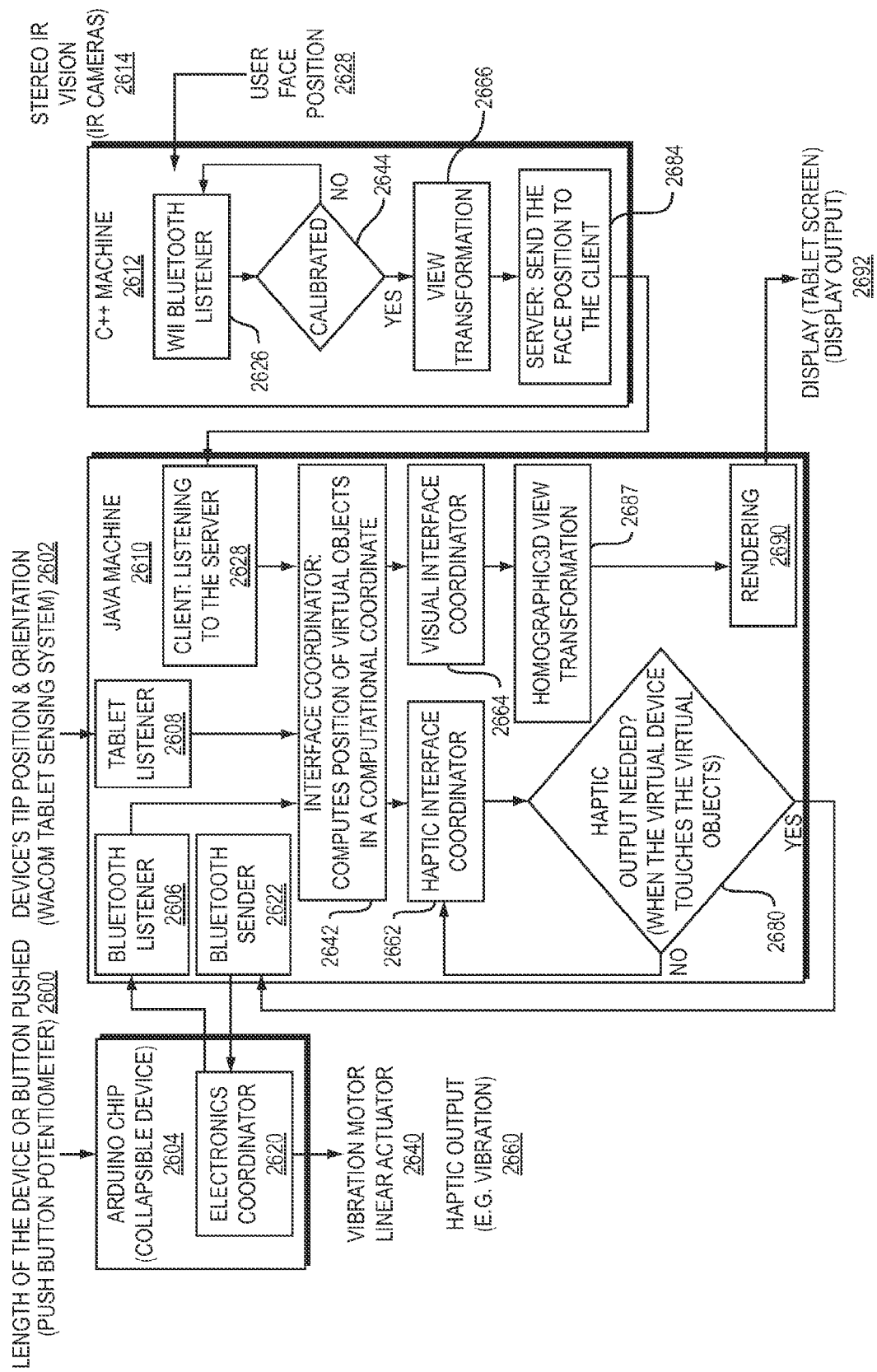
FIG. 26 is a flow chart for face tracking, 3D rendering, and haptic feedback, in a prototype of this invention.

FIG. 26 is a flow chart for face tracking, 3D visual display and haptic feedback, in a prototype of this invention. Stereo IR cameras 2614 capture images of user's face position 2628. A C++ machine 2612 communicates with the cameras using a bluetooth unit 2626. The C++ machine checks if the head tracking is calibrated 2644. If it is, the C++ machine performs view transformation 2666 and directs 2684 a server to send the user's face position to a client. If the head tracking is not calibrated, calibration is performed, as described below.

In the example shown in FIG. 26, the CID's tip position and orientation are detected using magnetic sensors 2602. A Java machine 2610 includes: a client 2628 that communicates with the server regarding face position, a communications unit 2608 for communicating with the magnetic sensors regarding the CID's tip position and orientation, a bluetooth listener 2606 for receiving communications from a chip in the CID, an interface coordinator 2642 that computes position of virtual objects in a computational coordinate, and a visual interface coordinator 2664. The Java machine 2610 performs homographic 3D view transformation 2687 and rendering 2690, and outputs signals for display 2692 of images. The Java machine also includes a haptic interface coordinator 2662 that checks 2680 if haptic output is needed (i.e., whether the virtual end of the CID is touching a virtual object). If it is, instructions for haptic feedback are sent via a bluetooth sender 2622 to a chip 2604 in the CID. The chip 2604 includes an electronics coordinator 2620 for controlling a vibration motor or linear actuator 2640 that delivers haptic output 2660, such as vibration, lengthening or shortening of the telescoping CID, or resistance to force applied by the user.

IR head tracking may be calibrated by moving an infrared LED to four calibration points on the display screen, one at a time.

In some embodiments, the CID interacts with a projected visual display. As shown in FIG. 27A, an overhead projector 2700 may project images of virtual objects on a surface 2701. As a user presses a physical CID 2702 against the surface 2701, the physical CID 2702 collapses (shortens) and it appears to a user as if the virtual end 2704 pushes through the surface 2701 to the virtual space beneath the surface 2701.

Alternately, the projection may be from below. As shown in FIG. 27B, a projector 2710 projects light that reflects off a mirror 2712 to form an image on a display screen 2715 that is visible to a user viewing that screen from above. When the CID 2714 is pressed against the display screen 2715, it appears to a user as if the virtual end 2716 of the CID goes through the screen into the virtual space beneath the screen.

Figure 27C:
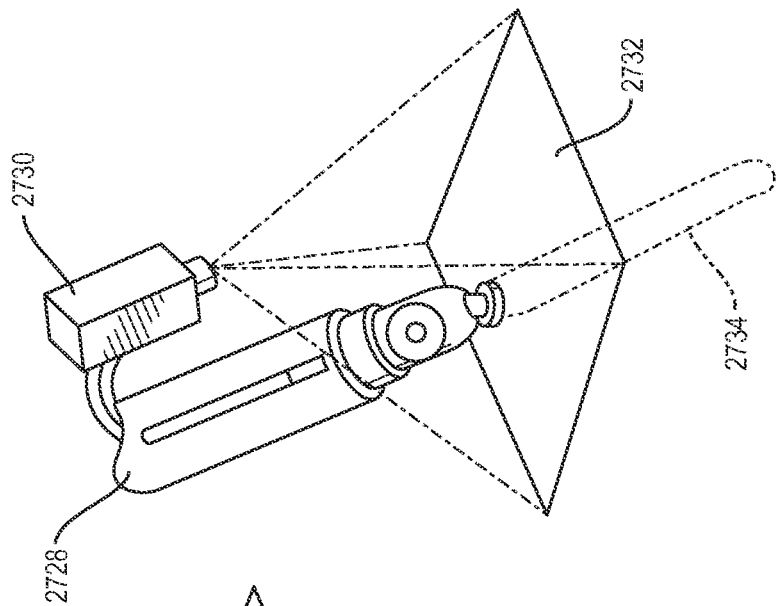
FIGS. 27A to 27C show alternate embodiments, in which virtual images are displayed by projection.
Figure 27B:
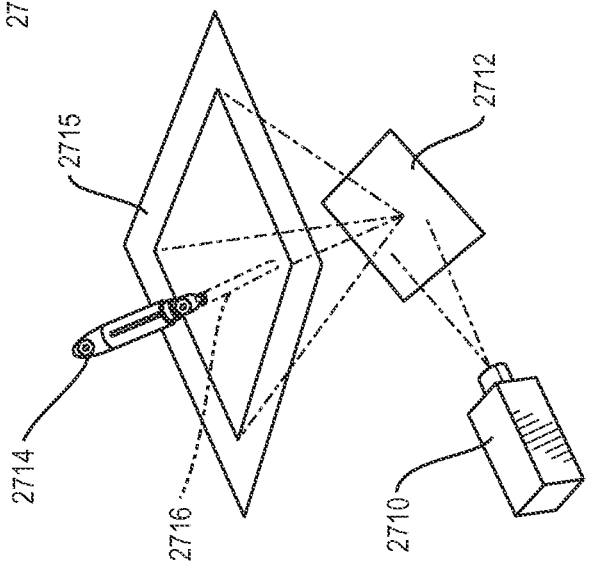
Figure 27A:
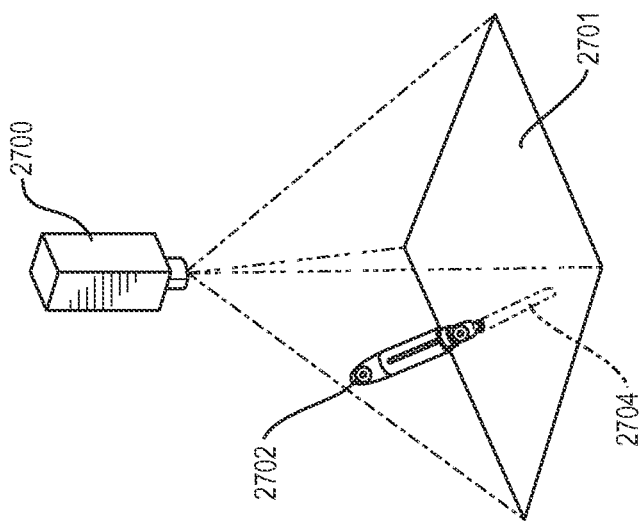

Alternately, as shown in FIG. 27C, a pico projector 2730 may be mounted on the CID 2728 to project images onto a surface 2732, and the virtual end 2734 of the CID may appear to push into the virtual space beneath that surface.

Figure 28:
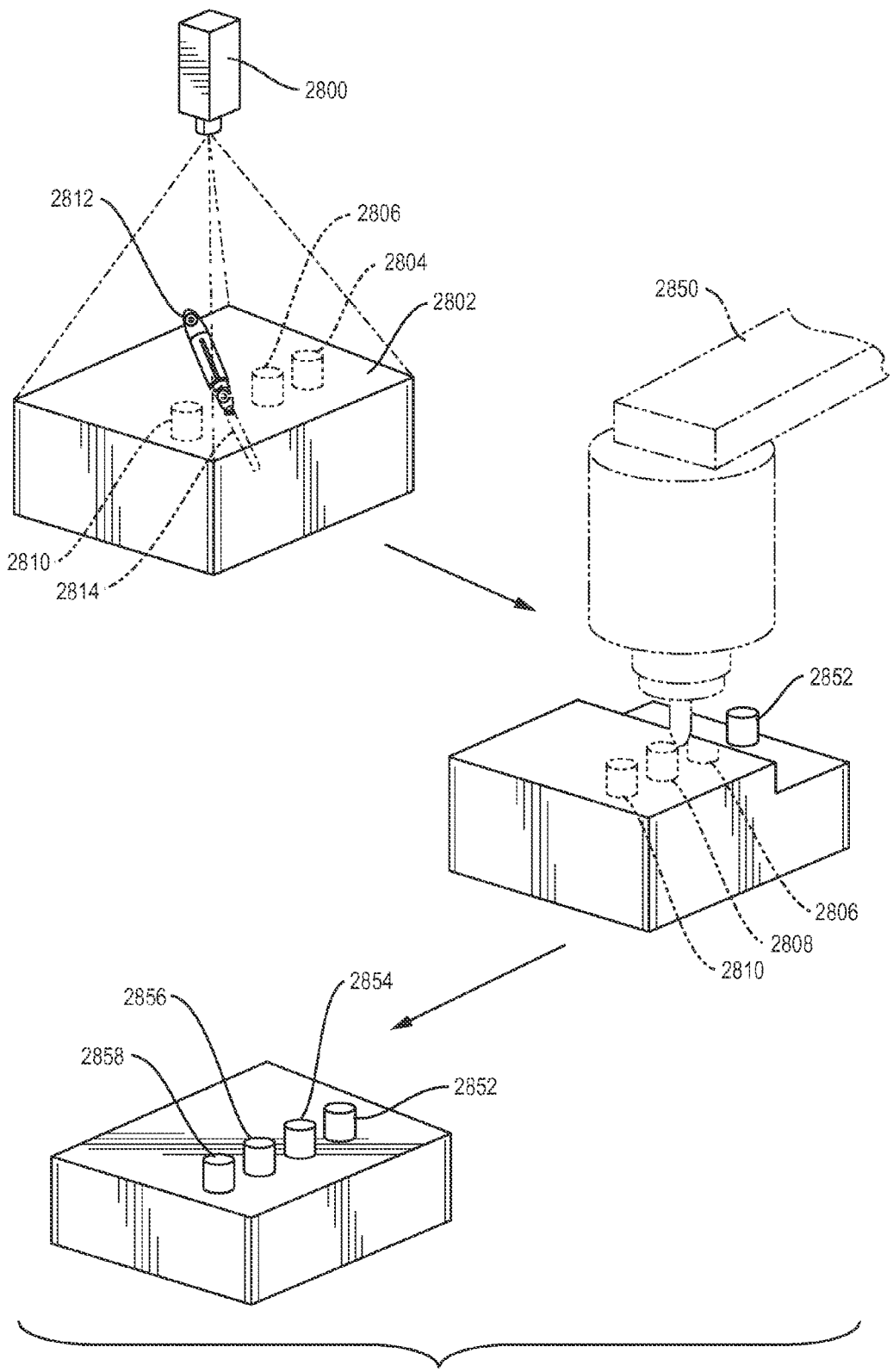
FIG. 28 shows a projector projecting images on a surface.

In some embodiments, a CID may be used to control CNC milling or other subtractive manufacturing. As shown in FIG. 28, a projector 2800 may project images on a surface 2802, such the top surface of a table remote from the CNC milling machine or even the top surface of material to be cut by the CNC milling machine. A CID 2812 may be used to input and interact with virtual images 2804, 2806, 2808, 2810 displayed on the surface by the projector. Digital information regarding those virtual 3D objects may be exported to a CNC milling machine 2850. The CNC milling machine 2850 may remove material, leaving physical objects, e.g. 2852, 2854, 2856, 2858, that conform to this 3D information. Alternately, the CNC milling machine may drill cavities for a mold, which cavities conform to this 3D information. This approach is not limited to CNC milling, but may be used with any digitally controlled method of subtractive manufacturing.

Item 1216 in FIG. 12B is the one or more processors that may be employed for this invention, including for computing tip position, orientation and length of the CID, for face or head tracking, for face or gesture recognition, for rendering and visual display of images, for control of haptic feedback, for sound output, and for the other functions described in FIG. 26. These one or more processors may be located in various positions. For example, they may be housed in whole or part in a projector, a display screen, a CID, a CNC milling machine, or in one or more remote computers, including website servers.

This invention may be implemented in many other ways, besides those described above. For example, gesture recognition may be implemented without fiducial markers or gloves. Or, for example, the push button unit may comprise multiple devices for accepting input from a user, including multiple buttons, dials, slider controls, piezoelectric sensors to measure the strength of the user's grip, or capacitive sensors for detecting touch input. Or, for example, gestures made by moving the CID in the air when it is not touching a display screen may be used to input user intent. Such gestures may be tracked, for example, by accelerometers, gyroscopes or other inertial measurement units.

Conclusion

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method comprising, in combination:
(a) using one or more sensors to detect data indicative of (i) orientation of an elongated apparatus relative to a surface, and (ii) physical length of the elongated apparatus; and (b) using an output device to present visual images on the surface;
wherein
(1) the elongated apparatus is configured to be handheld by a human user and to undergo reversible increases and decreases in the physical length, and
(2) during at least some times that the elongated apparatus is adjacent to the surface, the visual images include an apparent part of the elongated apparatus, which apparent part as viewable by the user appears (i) to be elongated, (ii) to be a continuation of the elongated apparatus beyond the surface, and (iii) to have an apparent length, which apparent length increases as the physical length decreases and decreases as the physical length increases, and
(3) during the at least some times, the apparent part and elongated apparatus together, as viewable by the user, appear to have a constant total length after taking into account foreshortening.

2. The method of claim 1, wherein:
(a) the surface is flat; and
(b) the method further comprises changing the visual images, in response to input from the user, such that a visual pattern oriented on the surface is apparently moved to an orientation that is not parallel to the surface.

3. A system comprising, in combination, an elongated apparatus, one or more sensors, and an output device, wherein:
(a) the elongated apparatus is configured to be handheld by a human user and to undergo reversible increases and decreases in physical length of the elongated apparatus;
(b) the one or more sensors are configured to detect data indicative of (i) the physical length, and (ii) orientation of the elongated apparatus relative to a surface; and
(c) the output device is configured to present visual images on the surface, which visual images, during at least some times that the elongated apparatus is adjacent to the surface, include an apparent part of the elongated apparatus, the apparent part as viewable by the user appearing (i) to be elongated, (ii) to be a continuation of the elongated apparatus beyond the surface, and (iii) to have an apparent length, which apparent length increases as the physical length decreases and decreases as the physical length increases, and (d) during the at least some times, the apparent part and elongated apparatus together, as viewable by the user, appear to have a constant total length after taking into account foreshortening.

4. The system of claim 3, wherein, during at least part of the at least some times, the visible images include images of a three dimensional grid.

5. The system of claim 3, wherein the output device is an electronic visual display and the surface comprises a screen of the electronic visual display.

6. The system of claim 5, wherein the screen is included in an electronic computing apparatus configured to be handheld by the user.

7. The system of claim 6, wherein the system further comprises the electronic computing apparatus configured to be handheld by the user.

8. The system of claim 5, wherein the screen is part of a computer monitor.

9. The system of claim 5, wherein the screen is configured to display 3D images.

10. The system of claim 5, wherein the output device includes at least one of a group consisting of: (i) lens for integral imaging, (ii) lenticular lenses, and (iii) parallax barriers.

11. The system of claim 3, wherein the one or more sensors include a magnetic sensor.

12. The system of claim 3, wherein the one or more sensors include an optical sensor.

13. The system of claim 3, further comprising one or more sensors configured to detect data indicative of (i) head position of the user or (ii) direction of gaze of the user.

14. The system of claim 3, wherein the system further comprises an actuator, which actuator is configured to provide haptic feedback to the user.

15. The system of claim 3, wherein the system is configured to accept input from the user, and, in response to the input, to effect changes to the visual images, which changes are in addition to any alteration of the apparent part of the elongated apparatus.

16. The system of claim 15, wherein the input comprises the user making changes in the orientation or the physical length of the elongated apparatus.

17. The system of claim 15, wherein the input comprises the user pressing a button.

18. The system of claim 15, wherein the input comprises hand gestures by the user.

19. The system of claim 3, wherein the system further comprises a camera, which camera is configured for capturing visual data indicative of hand gestures by the user.

20. An elongated apparatus configured to be handheld by a human user and to undergo reversible increases and decreases in physical length of the elongated apparatus, wherein:

(a) the elongated apparatus is configured to be used as part of a system;

(b) the system comprises the elongated apparatus, one or more sensors and an output device;

(c) the one or more sensors are configured to detect data indicative of (i) the physical length of the elongated apparatus, and (ii) orientation of the elongated apparatus relative to a surface;

(d) the output device is configured to present visual images on the surface;

(e) the visual images, during at least some times that the elongated apparatus is adjacent to the surface, include an apparent part of the elongated apparatus, the apparent part as viewable by the user appearing (i) to be elongated, (ii) to be a continuation of the elongated apparatus beyond the surface, and (iii) to have an apparent length, which apparent length increases as the physical length decreases and decreases as the physical length increases, and (f) during the at least some times, the apparent part and elongated apparatus together, as viewable by the user, appear to have a constant total length after taking into account foreshortening.

\* \* \* \* \*